(12) United States Patent
Rajadurai et al.

(10) Patent No.: US 10,911,934 B2
(45) Date of Patent: Feb. 2, 2021

(54) METHOD AND SYSTEM TO DETECT ANTI-STEERING OF ROAMING ACTIVITY IN WIRELESS COMMUNICATION NETWORK

(71) Applicant: SAMSUNG ELECTRONICS CO., LTD., Suwon-si (KR)

(72) Inventors: Rajavelsamy Rajadurai, Karnataka (IN); Lalith Kumar, Karnataka (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/632,079

(22) PCT Filed: Jul. 18, 2018

(86) PCT No.: PCT/KR2018/008118
§ 371 (c)(1),
(2) Date: Jan. 17, 2020

(87) PCT Pub. No.: WO2019/017689
PCT Pub. Date: Jan. 24, 2019

(65) Prior Publication Data
US 2020/0221281 A1 Jul. 9, 2020

(30) Foreign Application Priority Data

Jul. 18, 2017 (IN) .............................. 201741025493
Jan. 9, 2018 (IN) .............................. 201841000878
Jul. 13, 2018 (IN) .............................. 201741025493

(51) Int. Cl.
H04W 8/06 (2009.01)
H04W 76/30 (2018.01)
H04W 12/04 (2009.01)

(52) U.S. Cl.
CPC ............. *H04W 8/06* (2013.01); *H04W 12/04* (2013.01); *H04W 76/30* (2018.02)

(58) Field of Classification Search
CPC ....................................................... H04W 8/06
(Continued)

(56) References Cited

U.S. PATENT DOCUMENTS 8,254,916 B2    8/2012  Jessen et al.
8,364,143 B2    1/2013  Agretti et al.
(Continued)

FOREIGN PATENT DOCUMENTS

GB    2434055        7/2007
JP    2015-536096   12/2015
WO    2017/080623    5/2017

OTHER PUBLICATIONS

Extended European Search Report dated Apr. 28, 2020 for EP Application No. 18835049.0, 11 pages.
(Continued)

*Primary Examiner* — Joel Ajayi
(74) *Attorney, Agent, or Firm* — Nixon & Vanderhye P.C.

(57) ABSTRACT

Accordingly, embodiments herein provide a system for managing anti-steering of roaming in a wireless communication network. The system includes a HPLMN, a VPLMN and a UE. The HPLMN obtains a register request message from the VPLMN and derives at least one HPLMN specific security key based on at least one security parameter. Further, the HPLMN protects a preferred PLMN list using the at least one HPLMN specific security key and the security parameter and sends the protected preferred PLMN list to the VPLMN along with necessary security information. Further, the VPLMN is configured to receive the protected preferred PLMN list from the HPLMN and send a message including the protected preferred PLMN list to the
(Continued)

UE. The message mandates the VPLMN to send the preferred PLMN list transparently to the UE. Further, the UE is configured to receive the message including the preferred PLMN list from the VPLMN.

12 Claims, 11 Drawing Sheets

(58) Field of Classification Search
USPC .......................................................... 455/433
See application file for complete search history.

(56) References Cited

U.S. PATENT DOCUMENTS

| 2014/0092731 | A1 | 4/2014 | Gupta |
| 2015/0195701 | A1 | 7/2015 | Tuilier et al. |
| 2015/0351021 | A1 | 12/2015 | Zhang et al. |

OTHER PUBLICATIONS

3GPP TR 24.890 V0.2.1 (Jun. 2017), Technical Report, $3^{rd}$ Generation Partnership Project; Technical Specification Group Core Network and Terminals; 5G System—Phase 1; CT WG1 Aspects (Release 15), Jun. 2017, 71 pages.

International Search Report for PCT/KR2018/008118, dated Oct. 29, 2018, 8 pages.

Written Opinion of the ISA for PCT/KR2018/008118, dated Oct. 29, 2018, 5 pages.

http://books.google.co.in/books?id=ITMrAwAAQBAJ&pg=PR11&dq=%22anti+steering+of+roaming%22&hl=en&sa=X&ei=F5m_U4KjCo6i8AXmuYCYBA&ved=0CCUQ6AEwAA#v=onepage&q=%22anti%20steering%20of%20roaming%22&f=false (Virtual Roaming Data Services and Seamless Technology Change: GSM, LTE, WiFi).

3GPP TS 22.011 V12.3.0, '3GPP; Technical Specification Group Services and System Aspects; Service accessibility (Release 12)', Jun. 26, 2015, 28 pages.

Samsung, 'PLMN Selection in RRC INACTIVE state', R2-1706829, 3GPP TSG-RAN WG2 NR Ad-hoc #2, China, Qingdao, Jun. 16, 2017, 6 pages.

[Fig. 1]
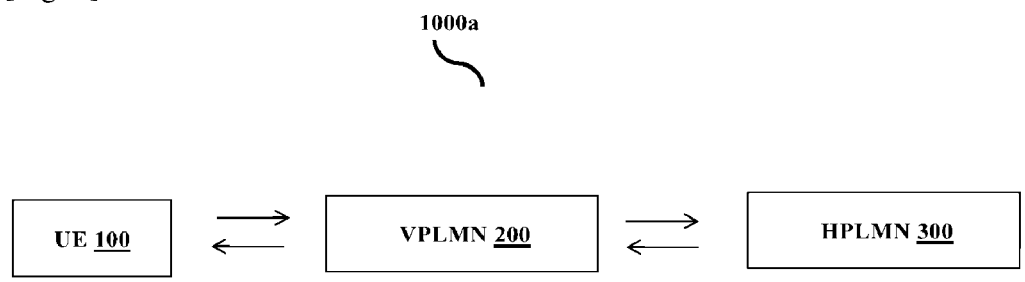
[Fig. 2]
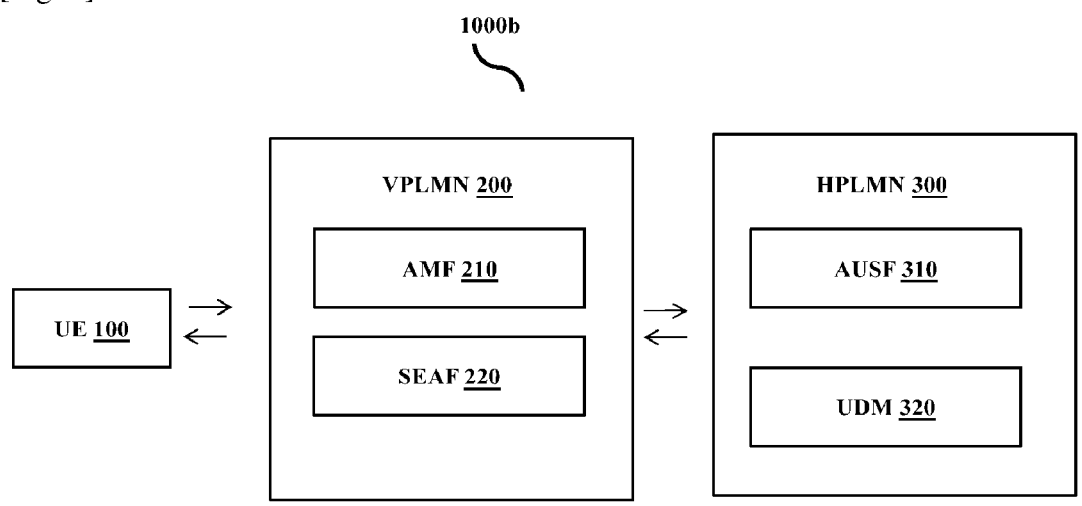

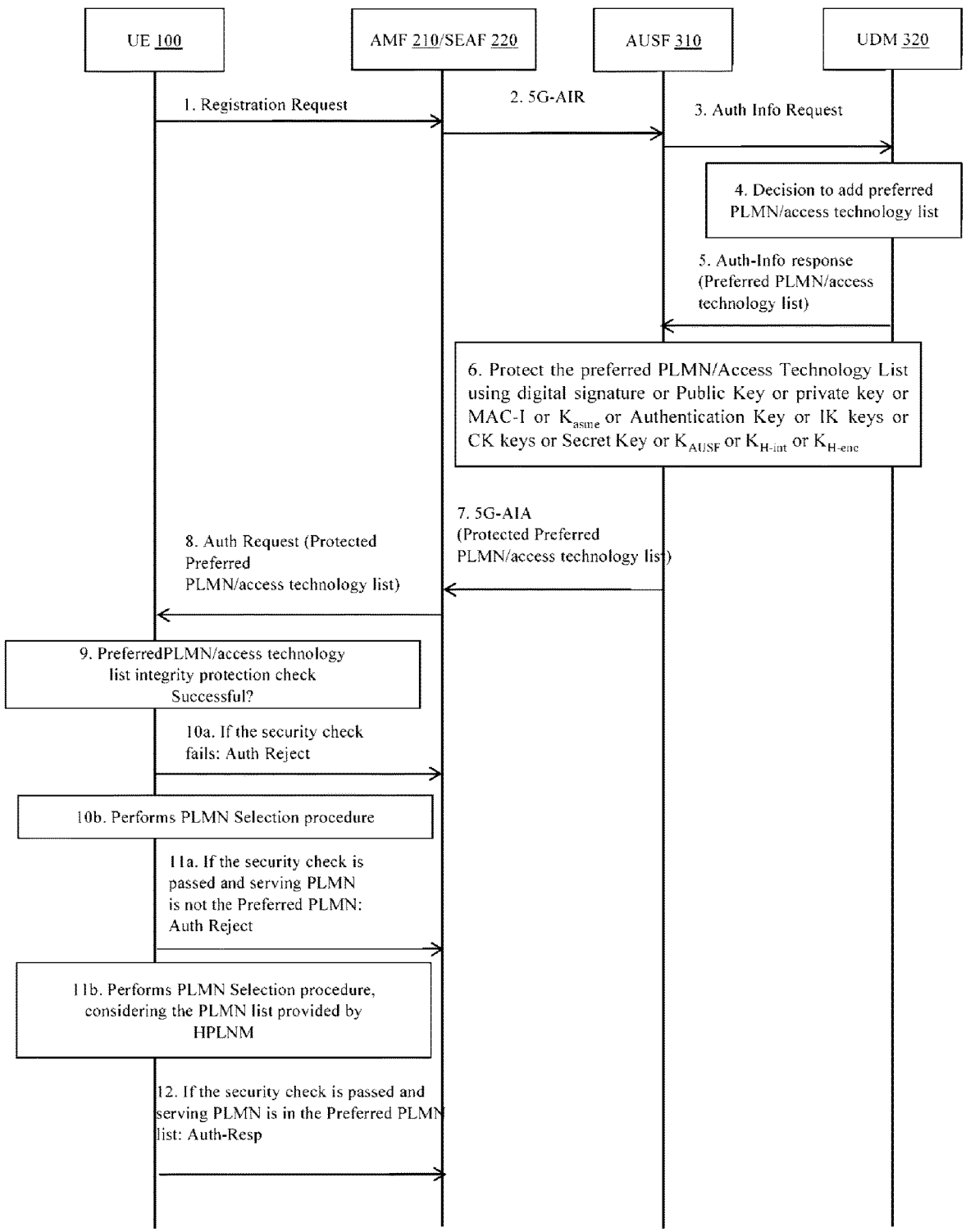

[Fig. 4]
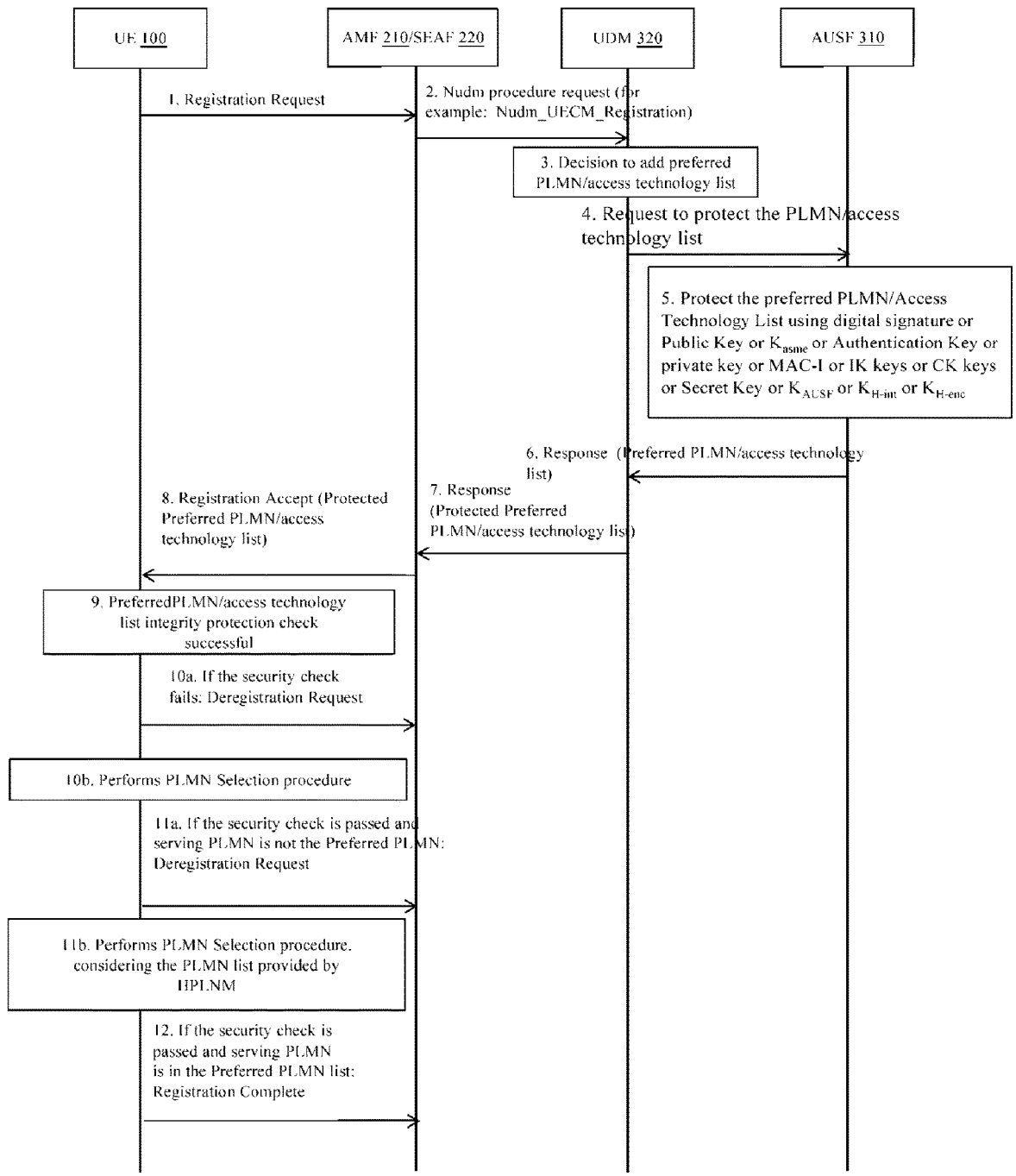

[Fig. 5]
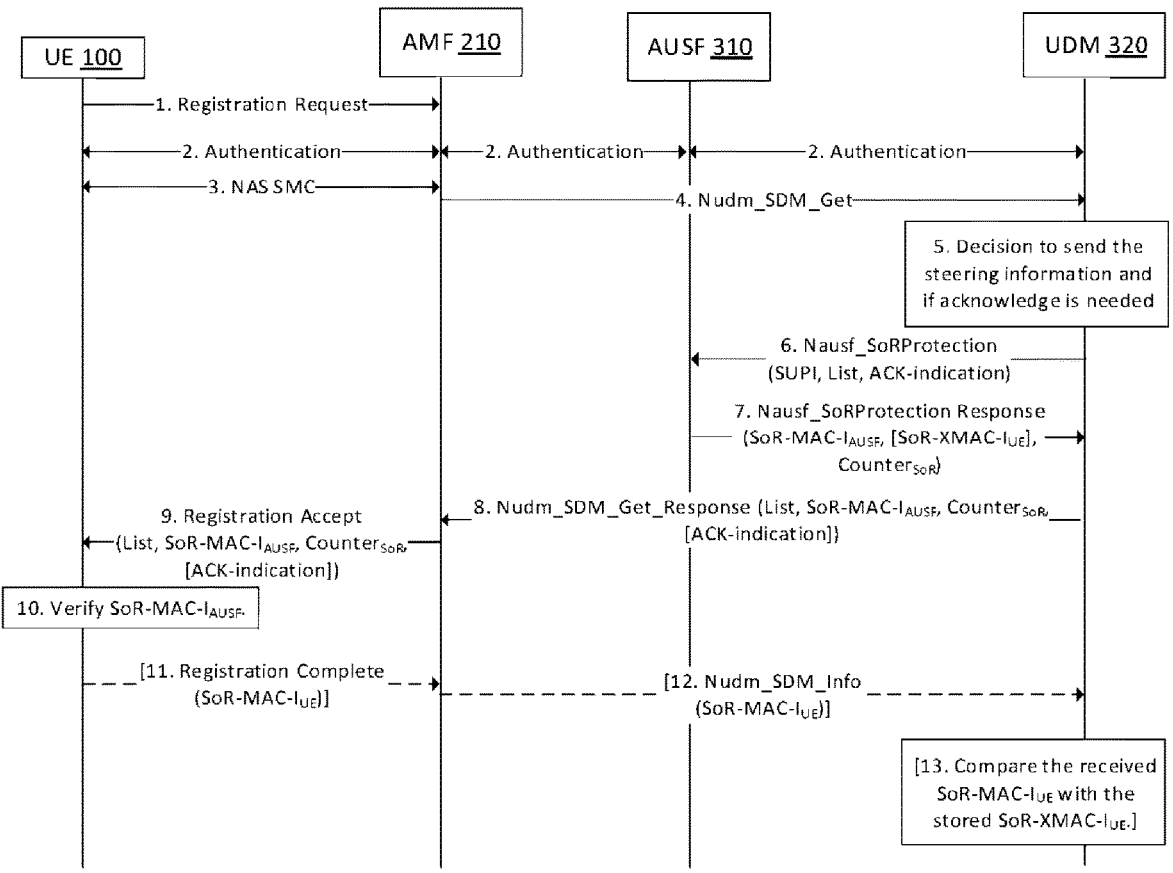

[Fig. 6]
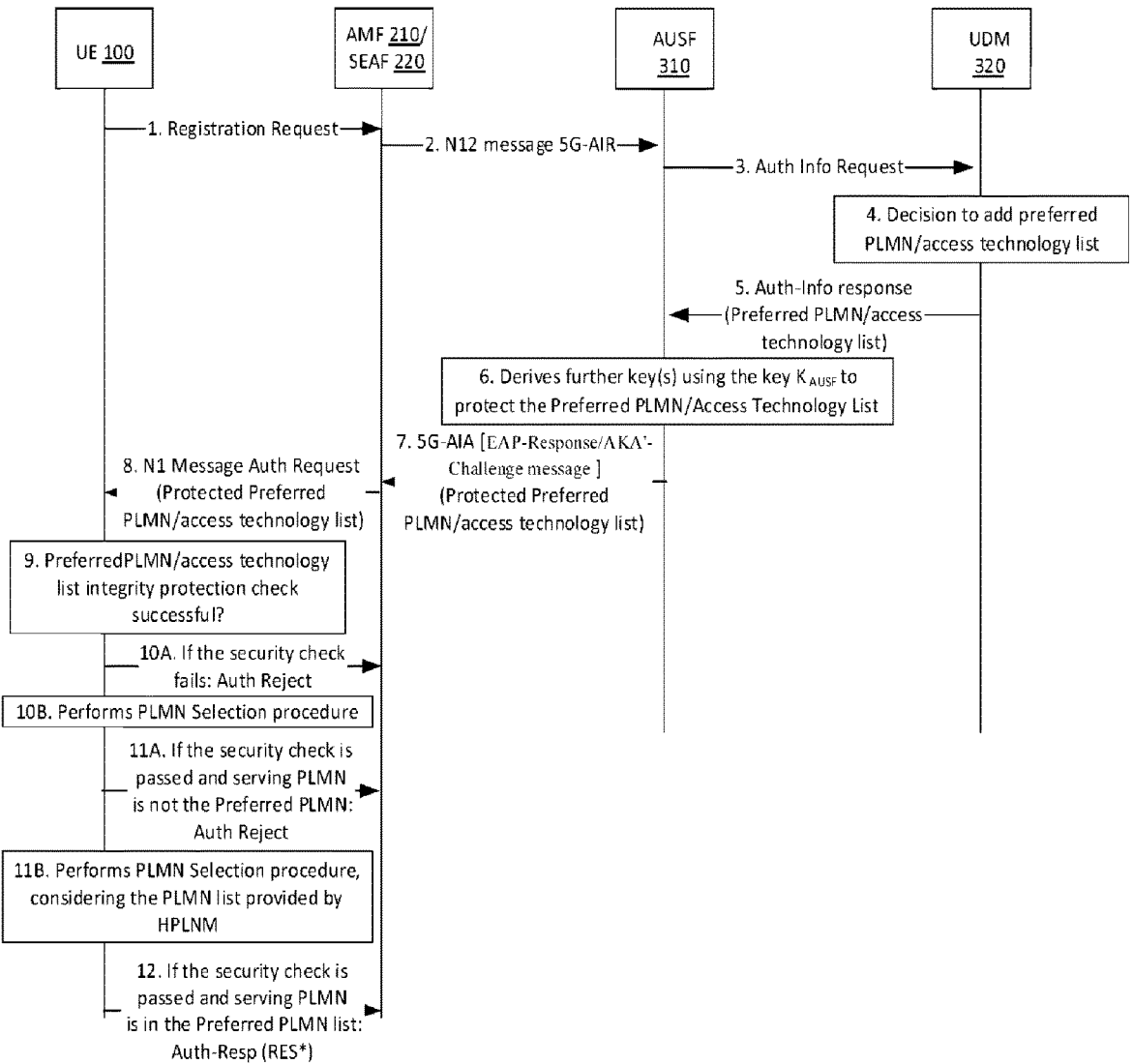
[Fig. 7]
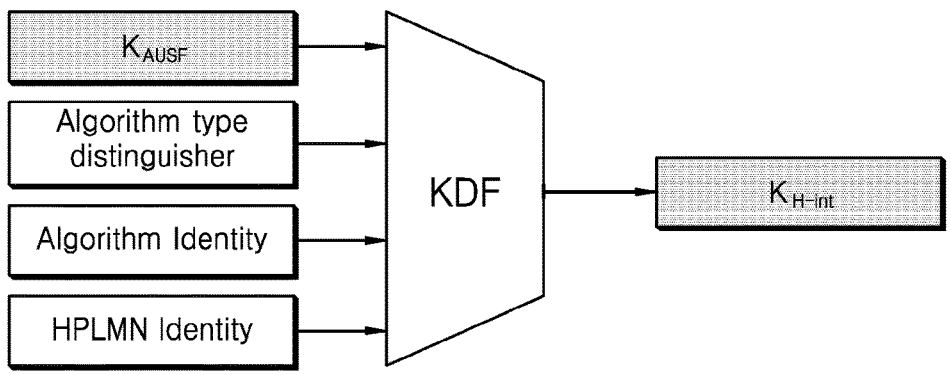

[Fig. 8]
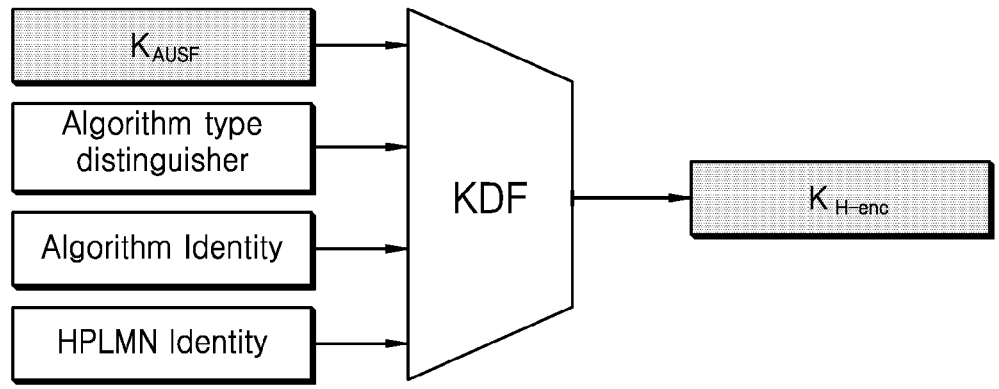
[Fig. 9]
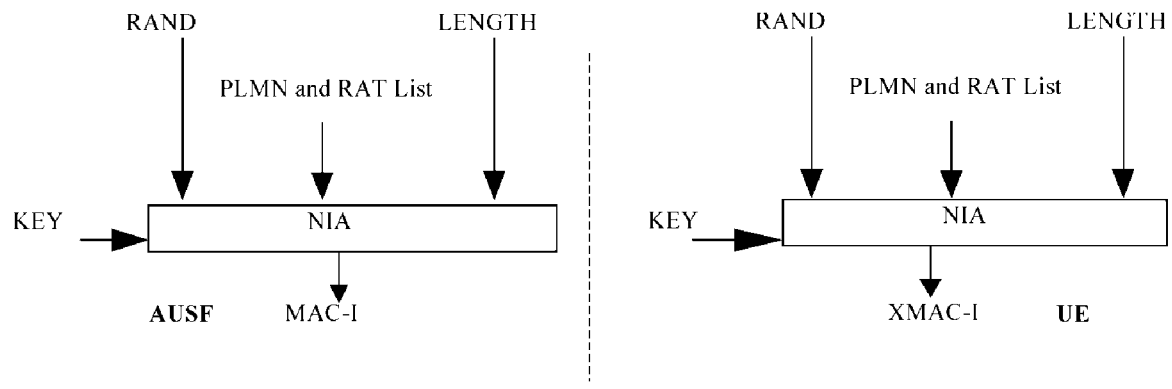
[Fig. 10]
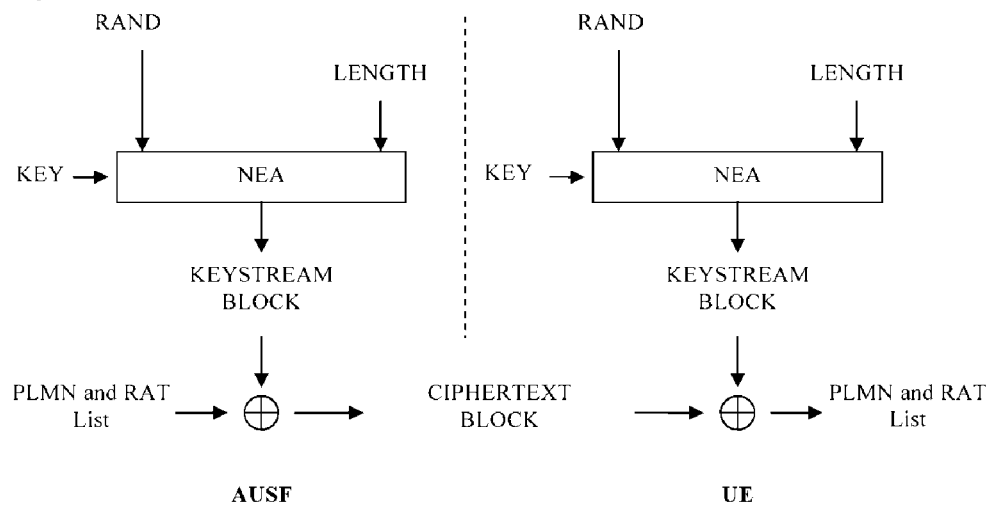

[Fig. 11]
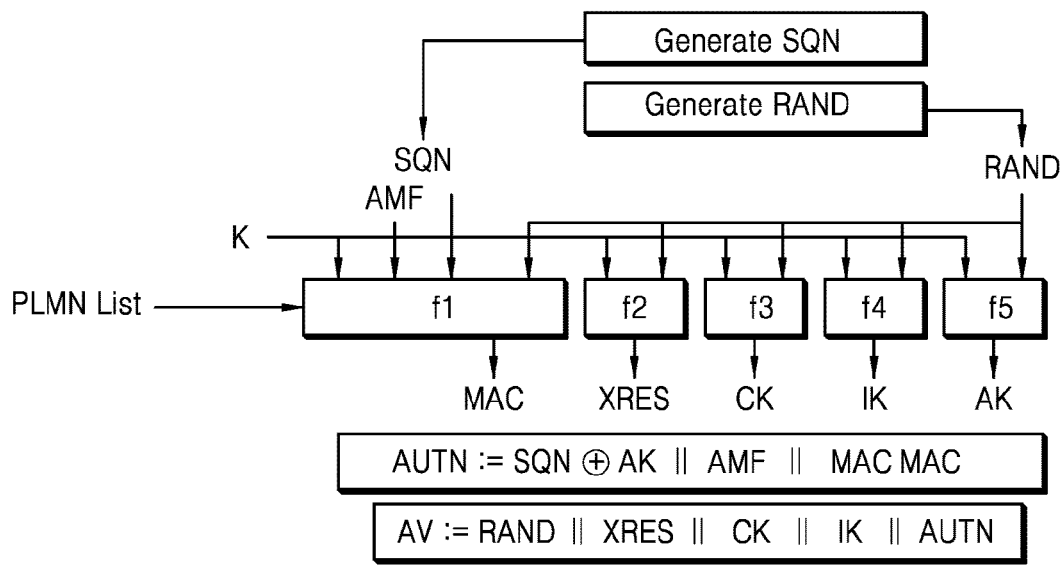
Diagram2: -Vector Derivation at Network side
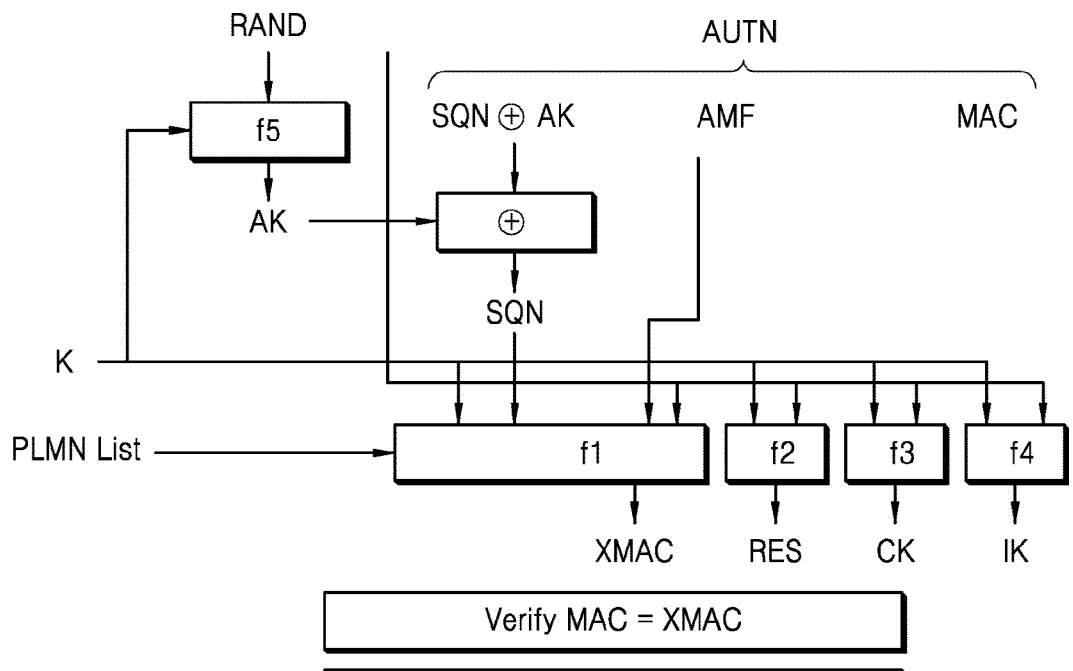
Diagram3: -Vector Derivation at USIM side

[Fig. 12]
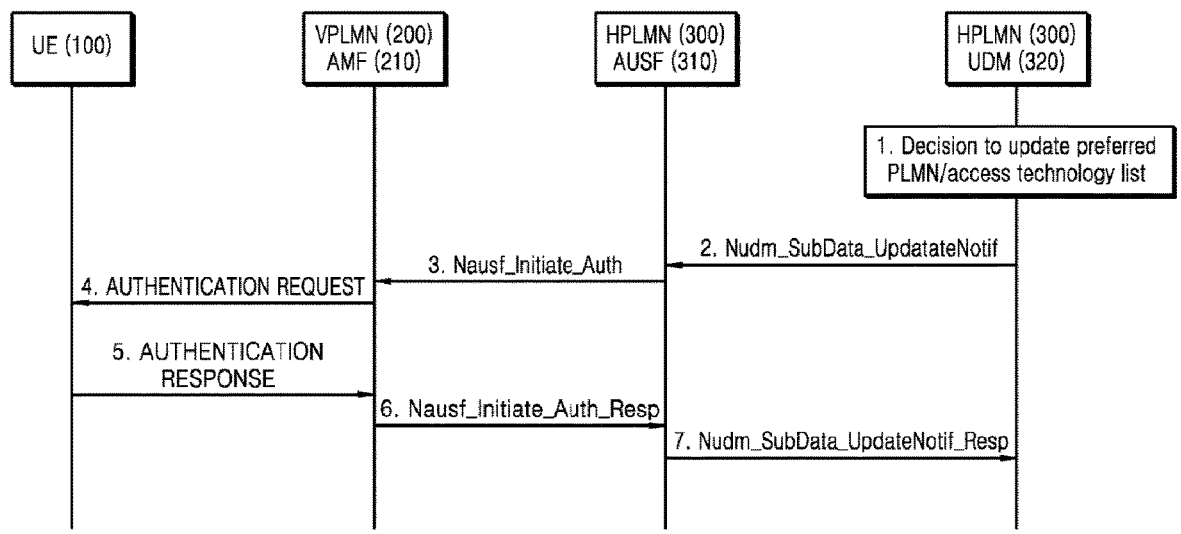

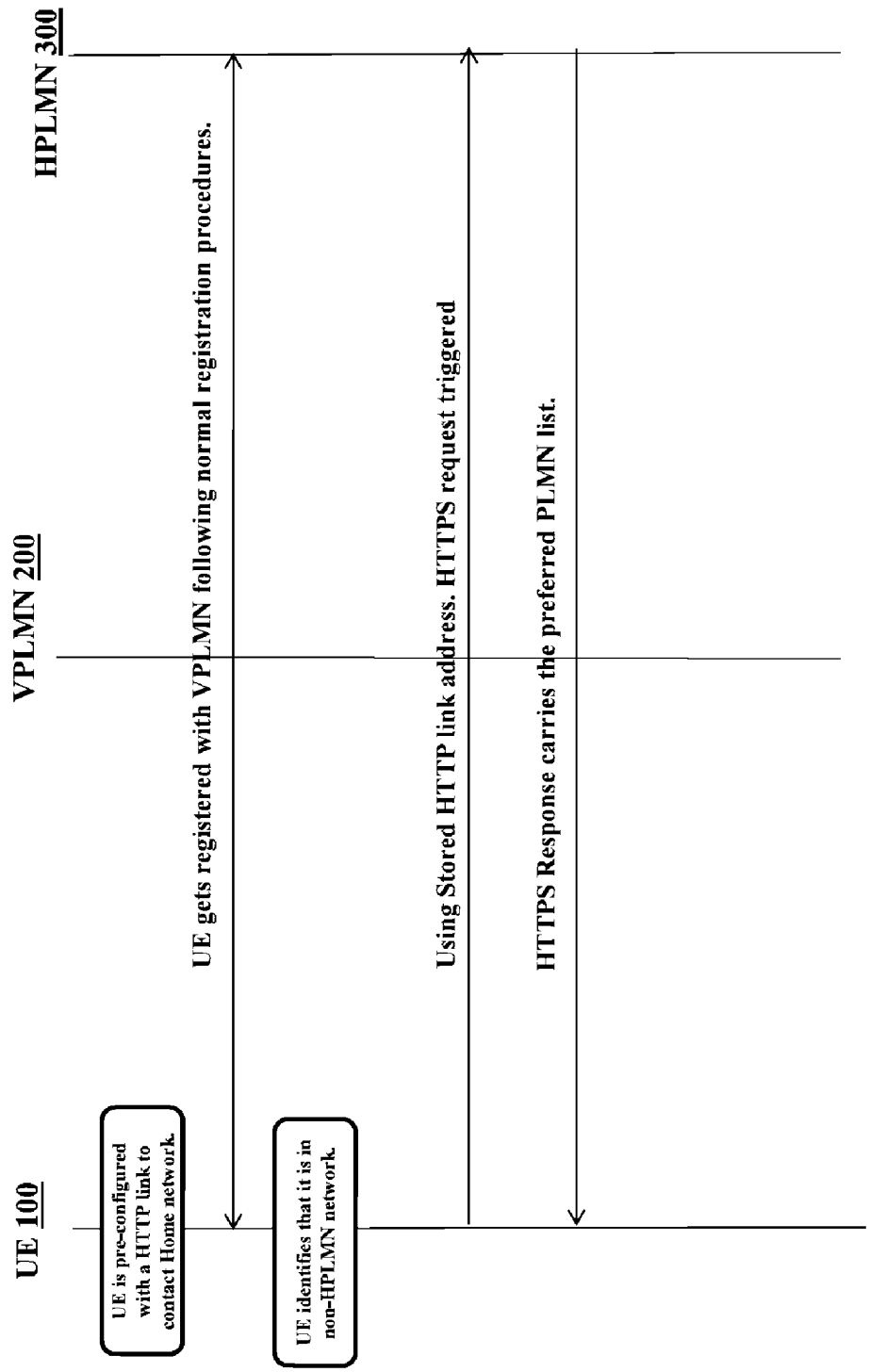

[Fig. 14]
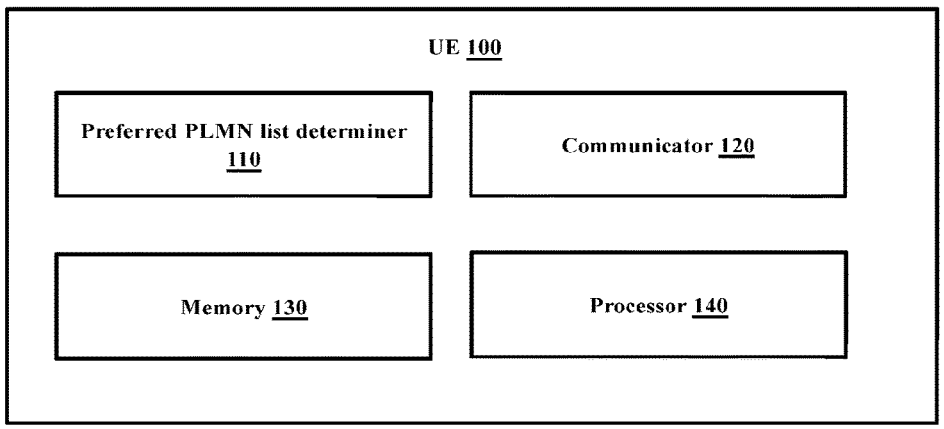
[Fig. 15]
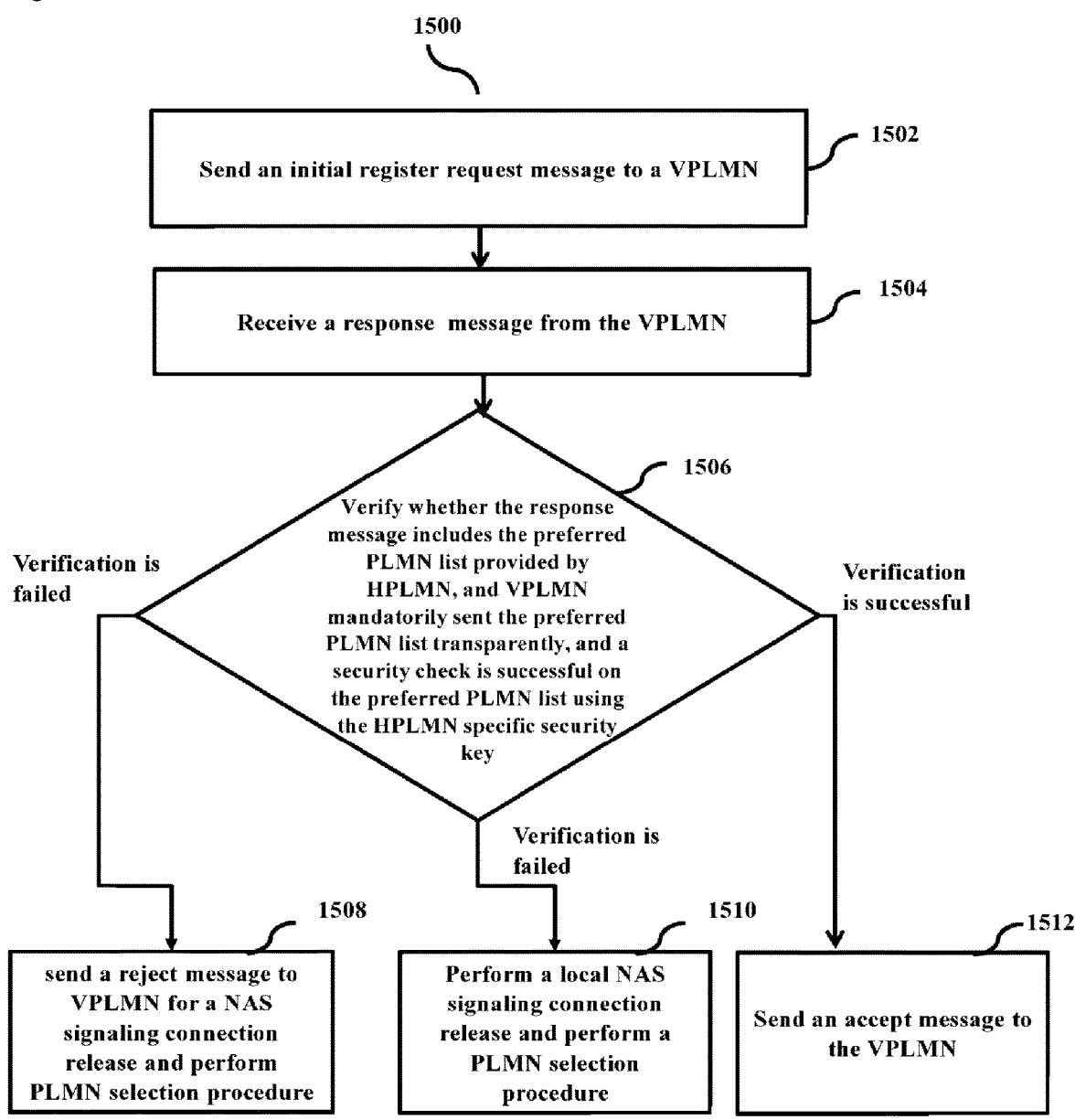

[Fig. 16]
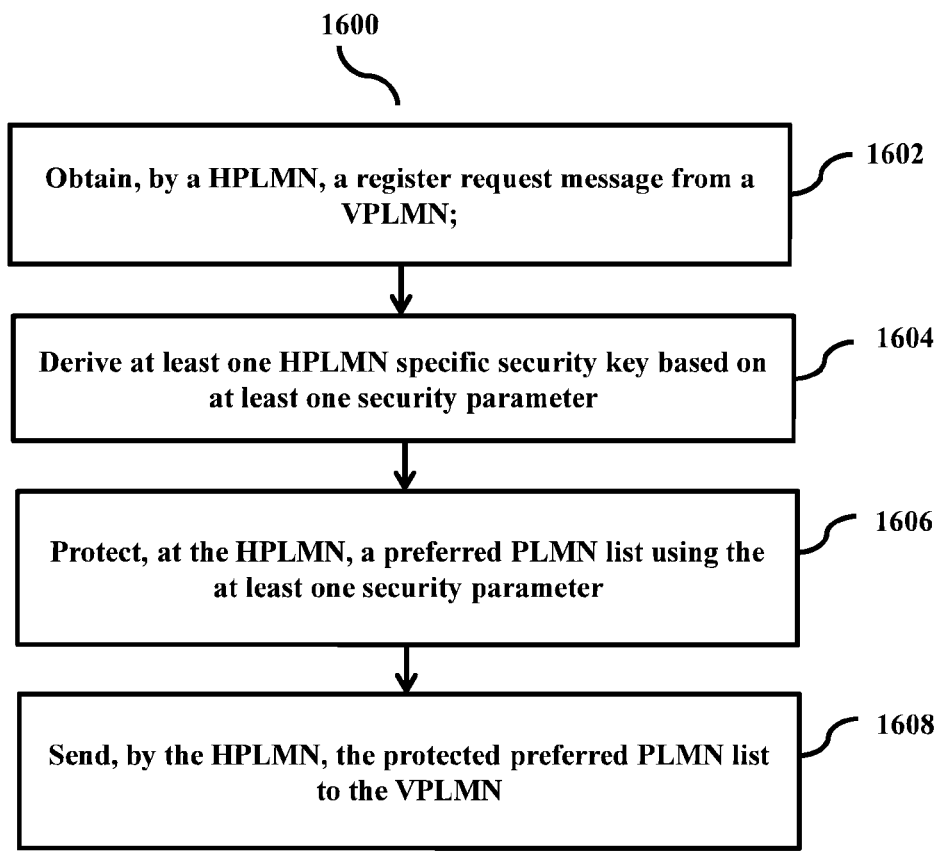

METHOD AND SYSTEM TO DETECT ANTI-STEERING OF ROAMING ACTIVITY IN WIRELESS COMMUNICATION NETWORK

This application is the U.S. national phase of International Application No. PCT/KR2018/008118, filed 18 Jul. 2018, which designated the U.S. and claims priority to IN Patent Application No. 201741025493, filed 18 Jul. 2017, IN Patent Application No. 201841000878, filed 9 Jan. 2018, and IN Patent Application No. 201741025493, filed 13 Jul. 2018, the entire contents of each of which are hereby incorporated by reference.

TECHNICAL FIELD

The present disclosure related to a wireless communication network, and more specifically related to a method and system for detecting anti-steering of roaming activity in the wireless communication network.

BACKGROUND ART

In general, both a subscriber and a regular mobile operator prefer that roaming activities be done with local operators whose prices are reasonable and the quality of whose networks is high. The option for a home network to select a hosting network, while the UE is in roaming, is called steering of roaming (or preferred roaming), and can be performed by two methods such as (i) network-based steering, and (ii) Subscriber Identity Module (SIM)-based steering.

The home operator selects roaming partners based on control costs, and call quality etc. The roaming partners which are not preferred by the home operator, also called as non-preferred PLMN or low preferred PLMN can interfere with the steering process which is called as anti-steering of roaming.

In the current scenario, an anti-steering roaming is not detectable actively as the signaling from the HPLMN can be blocked by the VPLMN, but the UE never knows that the signaling from the HPLMN is blocked by the VPLMN. Usually, the UE decides on the serving network based on the radio conditions. The anti-steering of roaming is detected passively by estimating a number of roaming subscribers of different types, including a number of unique active roamers, a number of unique steered roamers, and a number of unique anti-steered roamers.

In the current solutions, there are lot of difficulties such as (i) a home network operator will not be able to actively prevent anti-steering of roaming mechanisms and the home network operator will just be able to identify if any such activities are happening passively, (ii) the network operator have to install a Value Added Service (VAS) product called as anti-steering of roaming for just passive detection of such frauds. Further adding to the cost of the product and its maintenance, (iii) the user experience is hampered as it is charged more and also it may affect the quality of service till a Home Public Land Mobile Network (HPLMN) is able to detect the fraud, (iv) There are no standardized mechanism to stop this fraud actively, and (v) due to antisteering mechanism employed by a non-preferred or low-preferred visited network, HPLMN can face more signaling load and/or pay more for service provided by the non-preferred or low-preferred visited network compare to the preferred visited network. Finally, there are no low operational cost solutions for actively detecting and preventing the anti-steering mechanisms.

Thus, it is desired to address the above mentioned disadvantages or other shortcomings or at least provide a useful alternative.

DISCLOSURE OF INVENTION

Solution to Problem

The principal object of the embodiments herein is to provide a method and system for anti-steering of roaming activity in a wireless communication network.

Another object of the embodiments herein is to protect, by a HPLMN, a preferred PLMN list using at least one security parameter and at least HPLMN specific security key.

Another object of the embodiments herein is to send, by the HPLMN, the protected preferred PLMN list to a Visited Public Land Mobile Network (VPLMN) along with the security information and parameters, so that blocking/removing/modification of the preferred PLMN list is identifiable.

Another object of the embodiments herein is to transparently and mandatorily send, by the VPLMN, a request message including the protected preferred PLMN list to a User Equipment (UE), where the protected preferred PLMN list is received from the HPLMN.

Another object of the embodiments herein is to verify, by the UE, whether a response message to the request message including the preferred PLMN list is mandatorily provided by the VPLMN and a security check on the received preferred PLMN list is successful.

Another object of the embodiments herein is to send, by the UE, a reject message to the VPLMN and perform a PLMN selection procedure when the verification is failed.

Another object of the embodiments herein is performing a local Non-Access Stratum (NAS) signaling connection release and performing a PLMN selection procedure when the verification is failed.

Another object of the embodiments herein is to send, by the UE, an accept message to the VPLMN when the verification is successful.

Advantageous Effects of Invention

By the method and system of the present application anti-steering of roaming activity in a wireless communication network can be managed effectively.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1 is an overview of a system for managing an anti-steering of roaming in a wireless communication network, according to embodiments as disclosed herein;

FIG. 2 is another overview of a system for managing the anti-steering of roaming in the wireless communication network, according to embodiments as disclosed herein;

FIG. 3 is a sequence flow diagram illustrating step by step procedures for providing a list of preferred PLMN list during an authentication procedure in the wireless communication network, according to embodiments as disclosed herein;

FIG. 4 is a sequence flow diagram illustrating step by step procedures for providing the list of preferred PLMN list during a registration procedure (in the form of registration accept message) in the wireless communication network, according to embodiments as disclosed herein;

FIG. 5 is example sequence flow diagram illustrating step by step procedures for providing the list of preferred PLMN list during the registration procedure (in the form of registration accept message) in the wireless communication network, according to embodiments as disclosed herein;

FIG. 6 is a sequence flow diagram illustrating step by step procedures for providing the list of preferred PLMN list during an Extensible Authentication Protocol (EAP) based primary authentication in the wireless communication network, according to embodiments as disclosed herein;

FIG. 7 is an example scenario in which derivation of a Key KH-int is explained, according to embodiments as disclosed herein;

FIG. 8 is an example scenario in which derivation of a Key KH-enc is explained, according to embodiments as disclosed herein;

FIG. 9 is an example scenario in which MAC-I/XMAC-I on the PLMN and RAT list is obtained, according to embodiments as disclosed herein;

FIG. 10 is an example scenario in which ciphering of network steering information is explained, according to embodiments as disclosed herein;

FIG. 11 is an example scenario in which MAC is obtained using a PLMN list as one of the inputs, according to an embodiment as disclosed herein;

FIG. 12 is a sequence flow diagram illustrating step by step procedures for providing the list of preferred PLMN list when the UE is already registered with VPLMN, according to embodiments as disclosed herein;

FIG. 13 illustrates a sequence of operations for a data path solution (DPS), according to an embodiment as disclosed herein;

FIG. 14 is a block diagram of the UE, according to an embodiment as disclosed herein;

FIG. 15 is a flow diagram illustrating various operations performed, by the UE, for managing anti-steering of roaming in the wireless communication network, according to an embodiment as disclosed herein; and FIG. 16 is a flow diagram illustrating various operations performed, by the HPLMN, for managing anti-steering of roaming in the wireless communication network, according to an embodiment as disclosed herein.

BEST MODE FOR CARRYING OUT THE INVENTION

Accordingly, embodiments herein provide a method for managing anti-steering of roaming in a wireless communication network. The method includes sending, by a UE, an initial register request message to a Visited Public Land Mobile Network (VPLMN). Further, the method includes receiving, by the UE, a response message from the VPLMN in response to the initial register request message. The initial register request message mandates the VPLMN to send a preferred Public Land Mobile Network (PLMN) list in the response message. Further, the method includes verifying, by the UE, whether the response message comprises the preferred PLMN list provided by the Home Public Land Mobile Network (HPLMN), the VPLMN mandatorily sent the preferred PLMN list transparently and a security check is successful on the received preferred PLMN lists using at least one HPLMN specific security key. Further, the method includes causing, by the UE, to send a reject message to the VPLMN to perform a NAS signaling connection release and perform a PLMN selection procedure when the verification is failed or perform a local NAS signaling connection release and perform a PLMN selection procedure when the verification is failed, or send an accept message to the VPLMN when the verification is successful.

In an embodiment, the response message to the initial register request message includes one of an authentication request message, a registration accept request message and and a Non-Access Stratum (NAS) message.

In an embodiment, the reject message includes one of an authentication reject message and a NAS reject message.

In an embodiment, the accept message includes one of an authentication response message, a registration complete message and a NAS message.

In an embodiment, the verification is failed, when the preferred PLMN list provided by the HPLMN is not available in the response message or the preferred PLMN list provided by the HPLMN is available in the response message but the security check is not successful on the received preferred PLMN list.

In an embodiment, the verification is successful, when the preferred PLMN list provided by the HPLMN is available in the response message and the security check is successful on the received preferred PLMN list.

In an embodiment, the security check comprises determining whether a Message Authentication Code-Integrity (MAC-I) calculated by the UE and a MAC-I received in the response message are same.

In an embodiment, the preferred PLMN list in the response message is protected by the HPLMN using the at least one HPLMN specific security key.

In an embodiment, the at least one HPLMN specific security key includes at least one of a digital signature, a private key, a public key, a KASME, an authentication key (AK), an IK key, a CK key, a secret key, a KAUSF, a KH-int, a KH-enc and a Message Authentication Code-Integrity (MAC-I).

In an embodiment, the secret key is a public key of the HPLMN used by the UE, when the HPLMN specific security key is the asymmetric private key used by the HPLMN.

In an embodiment, the KASME key is obtained based on a PLMN list, when the HPLMN specific security key is the KASME key.

In an embodiment, the MAC-I is obtained on a PLMN list, using the HPLMN specific security key KAUSF, the PLMN list and a parameter as input to a security function.

In an embodiment, the UE verifies whether the response message comprises the preferred PLMN list provided by the HPLMN, when a configuration in a Universal Subscriber Identity Module (USIM) of the UE indicates a mandatory check for availability of the preferred PLMN list provided by the HPLMN in the request message received from the VPLMN.

In an embodiment, if the configuration in the UE indicates a mandatory check for availability of the preferred PLMN list then the HPLMN mandatorily sends at least the indication of no change (for e.g. 'no change of the "Operator Controlled PLMN Selector with Access Technology" list stored in the UE is needed and thus no list of preferred PLMN/access technology combinations is provided') in the preferred PLMN list (steering of roaming information) to the UE even if the HPLMN do not send the preferred PLMN list.

In an embodiment, when the HPLMN triggers the UE to initiate an initial registration procedure by explicitly providing a NAS message, the UE initiates an initial registration procedure and the UE obtains steering information representing the preferred PLMN based on the NAS message.

In an embodiment, if the verification fails in all the available and allowable PLMN's in an area of the UE, the UE neglects the verification failure and continue to get registered with the HPLMN.

In an embodiment, if the verification is successful and if the UE determines, based on available PLMN list of the area, that there is a higher priority PLMN than currently camped chosen VPLMN then, the UE performs the local NAS signaling connection releases and performs the PLMN selection to acquire services of higher priority PLMN available as per steering of roaming information received in the response message.

In an embodiment, if the verification is successful and if the UE determines, based on available PLMN list of an area, that there is a higher priority PLMN than currently camped chosen VPLMN, the UE sends the accept message and waits for the wireless communication network to release the NAS signaling connection.

In an embodiment, the UE performs the PLMN selection to acquire services of higher priority PLMN available as per steering of roaming information received in the response message after the release of NAS signaling connection.

Accordingly, embodiments herein provide a method for managing anti-steering of roaming in a wireless communication network. The method includes obtaining, by a HPLMN, a register request message from a VPLMN. Further, the method includes deriving, at HPLMN, at least one HPLMN specific security key based on at least one security parameter. Further, the method includes protecting, at the HPLMN, a preferred PLMN list using the at least one the HPLMN specific security key and the security parameter. The at least one of the security parameter and the HPLMN specific security key are used to avoid an interference with a steering process by a serving network. Further, the method includes sending, by the HPLMN, the protected preferred PLMN list to the VPLMN.

Accordingly, embodiments herein provide a UE for managing anti-steering of roaming in a wireless communication network. The UE includes a preferred PLMN list determiner coupled to a memory and a processor. The preferred PLMN list determiner is configured to send an initial register request message to a VPLMN. Further, the preferred PLMN list determiner is configured to receive a response message from the VPLMN. The initial register request message mandates the VPLMN to send a preferred PLMN list in the response message. Further, the preferred PLMN list determiner is configured to verify whether the request response message includes a preferred PLMN list provided by the HPLMN, the VPLMN mandatorily sent the preferred PLMN list transparently and a security check is successful on the received preferred PLMN list using at least one HPLMN specific security key. Further, the preferred PLMN list determiner is configured to send a reject message to the VPLMN for a NAS signaling connection release and perform a PLMN selection procedure when the verification is failed, or perform a local NAS signaling connection release and perform the PLMN selection procedure when the verification is failed or send an accept message to the VPLMN when the verification is successful.

Accordingly, embodiments herein provide a HPLMN for managing anti-steering of roaming in a wireless communication network. The HPLMN is configured to obtain a register request message from a VPLMN. The HPLMN is configured to derive at least one HPLMN specific security key based on at least one security parameter. The HPLMN is configured to protect a preferred PLMN list using the at least one security parameter and the HPLMN specific security key. The at least one of security parameter and the HPLMN specific security key are used to avoid interfere with a steering process by a serving network. The HPLMN is configured to send the protected preferred PLMN list to the VPLMN.

Accordingly, embodiments herein provide a system for managing anti-steering of roaming in a wireless communication network. The system includes a HPLMN, a VPLMN and a UE. The HPLMN is configured to obtain a register request message from the VPLMN and derive at least one HPLMN specific security key based on at least one security parameter. Further, the HPLMN is configured to protect a preferred PLMN list using the at least one of HPLMN specific security key and the security parameter and send the protected preferred PLMN list to the VPLMN. Further, the VPLMN is configured to receive the protected preferred PLMN list from the HPLMN and send a message including the protected preferred PLMN list to the UE. The message mandates the VPLMN to send the preferred PLMN list transparently to the UE. Further, the UE is configured to receive the request message from the VPLMN and verify whether the request message including the preferred PLMN list provided by the HPLMN and the VPLMN mandatorily sent the preferred PLMN list transparently, and a security check is successful on the received preferred PLMN list using at least one HPLMN specific security key. Further, the UE is configured to send a reject message to the VPLMN for a NAS signaling connection release and perform a PLMN selection procedure when the verification is failed, or perform a local NAS signaling connection release and perform a PLMN selection procedure when the verification is failed or send an accept message to the VPLMN when the verification is successful.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the term "protection" means integrity protection and/or confidentiality protection (encryption/decryption). The terms "encryption" and "ciphering" used herein can be used interchangeably without departing from the scope of the embodiments.

Throughout this disclosure, the terms "PLMN and RAT list", "PLMN and Access Technology List", "Home PLMN preferred VPLMN list", "Preferred PLMN and RAT list", "Preferred PLMN and Access Technology list", "Network Steering information", "Steering of Roaming information list", "SoR Information List", "SoR List", "list of preferred PLMN/access technology", "List", "preferred PLMN/access technology combination", "preferred PLMN/access technology combinations (or HPLMN indication that 'no change of the "Operator Controlled PLMN Selector with Access Technology" list stored in the UE is needed and thus no list of preferred PLMN/access technology combinations is provided')"," Steering of Roaming information", "Operator Controlled PLMN Selector with Access Technology list in priority order", "PLMN Selector List", and "Preferred PLMN list" used herein can be used interchangeably without departing from the scope of the embodiments. Throughout this disclosure, the terms "Counter SoR", "SoR Counter", "counter value" and "COUNT", used herein can be used interchangeably without departing from the scope of the embodiments. The terms "verification" and "security check" used herein can be used interchangeably without departing from the scope of the embodiments.

Throughout this disclosure, the term "PLMN selection", "UE selects some other higher priority PLMN after making current PLMN as lowest priority", "UE attempting to obtain service on a higher priority PLMN as specified in 3GPP TS 23.122 by acting as if timer T that controls periodic attempts has expired" can be used interchangeably without departing from the scope of the embodiments.

Accordingly, embodiments herein provide a system for managing anti-steering of roaming in a wireless communication network. The system includes a HPLMN, a VPLMN and a UE. The HPLMN is configured to obtain a register request message from the VPLMN and derive at least one HPLMN specific security key based on at least one security parameter. Further, the HPLMN is configured to protect a preferred PLMN list (for illustration, Operator Controlled PLMN Selector list or PLMN Selector list, which may contain a list of preferred PLMNs in priority order and shall be possible to have an associated Access Technology identifier) using the at least one HPLMN specific security key and send the protected preferred PLMN list to the VPLMN. Further, the VPLMN is configured to receive the protected preferred PLMN list from the HPLMN and send a message including the protected preferred PLMN list to the UE. The message mandates the VPLMN to send the preferred PLMN list transparently to the UE. Further, the UE is configured to receive the message including the preferred PLMN list from the VPLMN. Further, the UE is configured to verify whether the message including the preferred PLMN list provided by the HPLMN and the VPLMN mandatorily sent the preferred PLMN list transparently, and a security check is successful on the received preferred PLMN list using at least one HPLMN specific security key. Further, the UE is configured to send a reject message to the VPLMN for a NAS signaling connection release and perform a PLMN selection procedure when the security check is failed, or perform a local NAS signaling connection release and perform a PLMN selection procedure when the verification is failed or send an accept message to the VPLMN when the verification is successful.

Referring now to the drawings, and more particularly to FIGS. 1 through 16, there are shown preferred embodiments.

FIG. 1 is an overview of a system 1000a for managing an anti-steering of roaming in the wireless communication network, according to embodiments as disclosed herein. In an embodiment, the system 1000a includes a UE 100, a VPLMN 200 and a HPLMN 300. The UE 100 can be, for example but not limited to, a cellular phone, a tablet, a smart phone, a laptop, a Personal Digital Assistant (PDA), a global positioning system, a multimedia device, a game console, or the like. The UE 100 may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like.

The HPLMN 300 is configured to obtain a register request message from the VPLMN 200 and derive at least one HPLMN specific security key based on at least one security parameter. Further, the HPLMN 300 is configured to protect a preferred PLMN list using the at least one HPLMN specific security key and send the protected preferred PLMN list to the VPLMN 200.

Further, the VPLMN 200 is configured to receive the protected preferred PLMN list from the HPLMN 300 and send a request message mandatorily including the protected preferred PLMN list to the UE 100. In an embodiment, the request message includes one of an authentication request message and a registration accept request message.

Further, the UE 100 is configured to receive the request message from the VPLMN 200 and verify whether the request message including the preferred PLMN list provided by the HPLMN 300 is available and the verification of the security check on the received preferred PLMN list is successful. Further, the UE 100 is configured to send a reject message to the VPLMN 200, or release the NAS signaling connection locally and perform a PLMN selection procedure when the verification is failed, or send an accept message to the VPLMN 200 when the verification is successful. In an embodiment, the reject message includes one of an authentication reject message and a NAS message. In another embodiment, the accept message includes one of an authentication accept message and a registration complete message and a NAS message.

In an embodiment, the verification is failed, when the preferred PLMN list provided by the HPLMN 300 is not available in the request message or the preferred PLMN list provided by the HPLMN 300 is available in the request message but the security check on the preferred PLMN list is not successful.

In an embodiment, the verification is successful, when the preferred PLMN list provided by the HPLMN 300 is available in the request message and the security check on the received preferred PLMN list is successful.

Considering, when the UE 100 sends a request to the VPLMN 200 for accessing the wireless communication network, the VPLMN 200 sends a request to the HPLMN 300 to provide one or more than one Authentication Vectors (AVs). The HPLMN 300 provides one or more than one AVs along with the preferred PLMN list signed with one or more security parameter using at least one security key of the home network to the VPLMN 200 and the VPLMN 200 sends the received PLMN list along with one or more security parameter transparently to the UE 100 over a NAS message. The UE 100 verifying the one or more security parameter to confirm no alterations/modifications are done to the received PLMN list using the at least one security key and mandatory requirement is applied for the VPLMN 200 to provide PLMN list IE (or information) part of the NAS message, otherwise the UE 100 may decide to select some other PLMN. The security parameter can be, for example, but not limited to a digital signature, a public Key, a KASME, an authentication key, a IK key, an CK key, a secret key, a KAUSF, KH-int, KH-enc, or the like.

The preferred PLMN list is protected by using a digital signature mechanism. In an example, when the UE 100 sends the request to the VPLMN 200 for accessing the wireless communication network, the VPLMN 200 sends the request to the HPLMN 300 to provide one or more than one AVs. The HPLMN 300 provides one or more than one AVs along with the preferred PLMN list signed with a digital signature using a private key of the home network to the VPLMN 200 and the VPLMN 200 sends the received PLMN list along with the digital signature transparently to the UE 100 over the NAS message. The UE 100 verifying the digital signature to confirm no alterations/modifications are done to the received PLMN list using the secret key (The secret key is obtained using the public key of the home network) and mandatory requirement is applied for the VPLMN 200 to provide PLMN list IE (or information) part of the NAS message, otherwise the UE 100 may decide to select some other PLMN.

The preferred PLMN list is protected by using a public key of the UE 100. In another example, when the UE 100 sends the request to the VPLMN 200 for accessing the communication network, the VPLMN 200 sends the request to the HPLMN 300 to provide one or more than one AV. The HPLMN 300 provides the AV along with the PLMN list which is encrypted using a public key of the UE 100 and the VPLMN 200 sends the received PLMN list transparently to the UE 100 over the NAS message. The UE 100 decrypts the received PLMN list using the private key obtained using the public key and mandatory requirement is applied for the VPLMN 200 to provide the PLMN list IE (or information) part of an attach accept message otherwise, the UE 100 may decide to select some other PLMN.

The preferred PLMN list is protected by using KASME. In another example, when the UE 100 sends the request to the VPLMN 200 for accessing the wireless communication network, the VPLMN 200 sends request to the HPLMN 300 which provides the PLMN list and an intermediate key (in an example, in case of LTE, the intermediate key is the KASME) to the VPLMN 200. The intermediate key is the key generated by the HSS/AUSF and provided to the MME/SEAF/AMF. Throughout the disclosure, the KASME is referred as the intermediate key and appropriate key (for example, KAUSF) in the other 3GPP systems like 5G system. The KASME is generated with the PLMN list as one of the parameters. In an embodiment, the KASME is generated using the PLMN list as one parameter out of which further keys are derived like NAS anchor key and AS anchor keys (KeNB and/or KgNB). The VPLMN 200 sends the received PLMN list transparently to the UE 100 over the NAS message. In an embodiment, the input PLMN list contains the PLMN IDs in sequence according to priority, so that, the UE 100 obtains the preferred PLMN list in the priority order. The UE 100 generate the KASME using the PLMN list as one parameter out of which further keys are derived and mandatory requirement is applied for the VPLMN 200 to provide the PLMN list IE (or information) part of the attach accept message otherwise, the UE 100 may decide to select some other PLMN.

The preferred PLMN list is protected by using Authentication Key (Ak) key. In another example, the UE 100 sends the request to the VPLMN 200 for accessing the wireless communication network. The VPLMN 200 sends the request to the HPLMN 300 to provide one or more than one AVs. Further, the HPLMN 300 provides the PLMN list to the VPLMN 200 and also Expected Response (XRES*) along with other parameters to the VPLMN 200. The XRES* is generated with the PLMN list as one of the parameters. Further, the VPLMN 200 sends the received PLMN list transparently to the UE 100 over the NAS message. The UE 100 generates the Response (RES*) using the received PLMN list as one of the parameter, the UE 100 responds to the NAS message with calculated the RES* value. The VPLMN 200 checks if the received RES* is equivalent to the XRES*. If the RES* and XRES* are not same, the authentication procedure fails. Mandatory requirement is applied for the VPLMN 200 to provide PLMN list IE (or information) part of the NAS message otherwise, the UE 100 may decide to select some other PLMN.

The preferred PLMN list is protected by using the Message Authentication Code (MAC) function. In another example, when the UE 100 sends the request to the VPLMN 200 for accessing the wireless communication network, the VPLMN 200 sends the request to the HPLMN 300 for providing the PLMN list and Authentication Token (AUTN) to the VPLMN 200. The AUTN is generated with the PLMN list as one of the parameters and the VPLMN 200 sends received PLMN list transparently to the UE 100 over the NAS message. The UE 100 generates the Expected Mac (XMAC) using the PLMN list as one parameter, the UE 100 validates if the XMAC and MAC are same to check if the PLMN list received by UE 100 is not distorted. The mandatory requirement is applied for the VPLMN 200 to provide the PLMN list IE (or information) part of attach accept message (In 5GS context, its REGISTRATION ACCEPT message) otherwise, the UE 100 may decide to select some other PLMN. The MAC is derived using PLMN list as one of the inputs as shown in the FIG. 11.

The preferred PLMN list is protected by using key "K": In another example, when the UE 100 sends the request to the VPLMN 200 for accessing the wireless communication network, the VPLMN 200 sends the request to the HPLMN 300 which provides one or more than one AVs. The HPLMN 300 provides the AVs along with PLMN list which is encrypted or integrity protected using a secret key ("K") and the VPLMN sends the received PLMN list transparently to the UE 100 over the NAS message. The UE 100 decrypts the received PLMN list using the secret key ("K") and applies the mandatory requirement for the VPLMN 200 to provide the PLMN list IE (or information) part of the attach accept message (In 5GS context, its REGISTRATION ACCEPT message) or the authentication request message otherwise, the UE 100 may decide to select some other PLMN to get the preferred PLMN list IE.

The preferred PLMN list is protected by using KASME of the HPLMN 300: In another example, when the UE 100 sends a request to the VPLMN 200 for accessing the wireless communication network, the VPLMN 200 sends the request to the HPLMN 300 which provides one or more than one AVs. The VPLMN 200 sends the received PLMN list which is encrypted and/or integrity protected using a Home KASME. The Home KASME is derived as similar process of deriving KASME but by using SNID=HPLMN ID. Further, the VPLMN 200 send the received PLMN list transparently to the UE 100 over the NAS message and the UE 100 decrypts the received PLMN list using the IK or CK keys and the mandatory requirements is applied for the VPLMN 200 to provide the PLMN list IE (or information) part of attach accept (In 5GS context, its REGISTRATION ACCEPT message) or authentication procedures otherwise, the UE 100 will decide to select some other PLMN.

The preferred PLMN list is protected by using IK and CK keys: In another example, when the UE 100 sends the request to the VPLMN 200 for accessing the wireless communication network, the VPLMN 200 sends the request to the HPLMN 300 which provides one or more than one AVs. The HPLMN 300 provides the AVs along with PLMN list which is encrypted or integrity protected using IK or CK keys and the VPLMN 200 sends the received PLMN list transparently to the UE 100 over the NAS message. The UE 100 decrypts the received PLMN list using the IK or CK keys and applies the mandatory requirement for the VPLMN 200 to provide PLMN list IE (or information) part of attach accept message or authentication procedures otherwise, the UE 100 will decide to select some other PLMN.

Although the FIG. 1 show various hardware components of the system 1000a but it is to be understood that other embodiments are not limited thereon. In other embodiments, the system 1000a may include less or more number of components. Further, the labels or names of the components are used only for illustrative purpose and does not limit the scope of the invention. One or more components can be combined together to perform same or substantially similar function to manage the anti-steering of roaming in the wireless communication network.

FIG. 2 is another overview of a system 1000b for managing the anti-steering of roaming in the wireless communication network, according to embodiments as disclosed herein. In an embodiment, the system 1000a includes the UE 100, the VPLMN 200 and the HPLMN 300. The VPLMN 200 includes an AMF (Access and Mobility Function) 210 and a SEAF (Security Anchor Function) 220. The HPLMN 300 includes an AUSF (Authentication Server Function) 310 and a UDM (Unified Data Management) 320.

In an embodiment, the UE 100 sends a register request message to the AMF 210. Further, the AMF 210 requests the AUSF 310 to perform a primary authentication. Further, the AUSF 310 requests the UDM 320 to provide the AV to carry out the authentication.

Based on a HPLMN policy, the UDM 320 decides to add the preferred PLMN list along with the AVs or later within the registration procedure and the UDM 320 provides the AV(s) with the preferred PLMN list to the AUSF 310.

Further, the AUSF 310 protects the preferred PLMN list using the at least one security parameter (e.g., digital signature or Public Key or KASME or Authentication Key or IK keys or CK keys or Secret Key or KAUSF or KH-int or KH-enc or the like).

Further, the AUSF 310 sends the 5G Authentication Initiation Answer (5G-AIA) message over a N12 to the SEAF 220. In the 5G-AIA message, the AUSF 310 includes the integrity protected preferred PLMN list using at least one security parameter. Further, the AMF 210/SEAF 220 sends the received protected PLMN list(s) transparently to the UE 100 over the NAS message (i.e., authentication request message). In an embodiment, the AMF 210/SEAF 220 selects the AV, if receives multiple AVs, and sends the corresponding protected PLMN list(s) transparently to the UE 100 over the NAS message.

Further, based on the configuration of the USIM in the UE 100, the UE 100 expects the protected PLMN and RAT list in the authentication response message. If the configuration indicates mandatory check for preferred PLMN list, then the UE 100 verifies the integrity of the received PLMN list by deriving the key in the same way as the AUSF 310.

If the security check fails, the UE 100 sends the authentication reject message to the VPLMN 200. The UE 100 performs the PLMN selection, if the protected PLMN and RAT list is missing or verification fails.

Further, if the security check is passed and a serving PLMN is not the preferred PLMN, the UE 100 sends the authentication reject message to the VPLMN 200. Further, the UE 100 performs the PLMN selection considering the PLMN list provided by the HPLNM 300.

Further, if the security check is passed and the serving PLMN is in the preferred PLMN list, the UE 100 sends the authentication accept message to the VPLMN 200.

In another embodiment, the UE 100 sends the register request message to the AMF 210. Further, the AMF 210 registers with the UDM 320 by initiating Nudm_UECM_Registration procedure. Between first two steps, other procedure may be performed, for example an authentication procedure or registration procedure.

In an embodiment, the AMF 210 may provide the Subscription Permanent Identifier (SUPI), Sequence Number of the AV and/or ngKSI and/or RAND of the AV and/or KAUSF Key Set Identifier along with SUPI, so that the AUSF 310 identifies the appropriate KAUSF.

Further, based on the HPLMN policy, the UDM 320 decides to add the preferred PLMN list. Further, the UDM 320 request the AUSF 310 to apply protection for the PLMN/RAT list.

Further, the AUSF 310 protects the preferred PLMN list using the at least one security parameter. Further, the AUSF 310 sends the 5G Authentication Initiation Answer (5G-AIA) message over the N12 to the SEAF 220. In the 5G-AIA message, the AUSF 310 includes the integrity protected preferred PLMN list using at least one security parameter.

Further, the AMF 210/SEAF 220 sends the received protected PLMN list(s) transparently to the UE 100 over the NAS message (i.e., attach request message). In an embodiment, the AMF 210/SEAF 220 selects the AV, if receives multiple AVs, and sends the corresponding protected PLMN list(s) transparently to UE 100 over the NAS message.

Further, based on the configuration of the USIM in the UE 100, the UE 100 expects the protected PLMN and RAT list in the authentication response message. If the configuration indicates mandatory check for preferred PLMN list, then the UE 100 verifies the integrity of the received PLMN list by deriving the key in the same way as the AUSF 310.

Further, the security check fails, the UE 100 sends the registration reject message to the VPLMN 200. Further, the UE 100 performs the PLMN selection, if the protected PLMN and RAT list is missing or verification fails.

In an embodiment, if the security check is passed and serving PLMN is not the preferred PLMN, the UE 100 sends the registration reject message to the VPLMN 200. Further, the UE 100 performs the PLMN selection considering the PLMN list provided by HPLNM 300.

If the security check is passed and the serving PLMN is in the preferred PLMN list, the UE 100 sends the registration accept message to the VPLMN 200.

However, the detailed procedures of the providing the list of preferred PLMN list during the authentication procedure or the registration accept procedure, while managing the anti-steering of the roaming activity in the wireless communication network, are explained in the conjunction with the FIG. 3 to the FIG. 11.

Although the FIG. 2 shows various hardware components of the system 1000b but it is to be understood that other embodiments are not limited thereon. In other embodiments, the system 1000b may include less or more number of components. Further, the labels or names of the components are used only for illustrative purpose and does not limit the scope of the invention. One or more components can be combined together to perform same or substantially similar function to manage the anti-steering of roaming in the wireless communication network.

FIG. 3 is a sequence flow diagram illustrating step by step procedures for providing the list of preferred PLMN list during the authentication procedure in the wireless communication network, according to embodiments as disclosed herein.

As shown in the FIG. 3, at 1, the UE 100 sends a register request message to the AMF 210. At 2, the AMF 210 requests the AUSF 310 to perform the primary authentication. At 3, the AUSF 310 requests the UDM 320 to provide the AV to carry out the authentication.

At 4, based on the HPLMN policy, the UDM 320 decides to add the preferred PLMN list along with the AVs. At 5, the UDM 320 provides the AV(s) with the preferred PLMN list to the AUSF 310.

At 6, the AUSF 310 protects the preferred PLMN list using the at least one security parameter (e.g., digital signature or Public Key or KASME or Authentication Key or IK keys or CK keys or Secret Key or KAUSF or KH-int or KH-enc or the like).

At 7, the AUSF 310 sends the 5G-AIA message over the N12 to the SEAF 220. In the 5G-AIA message, the AUSF 310 includes the integrity protected preferred PLMN list using at least one security parameter.

At 8, the AMF 210/SEAF 220 sends the received protected PLMN list(s) transparently to the UE 100 over the NAS message (i.e., authentication request message). In an embodiment, the AMF 210/SEAF 220 selects the AV, if receives multiple AVs, and sends the corresponding protected PLMN list(s) transparently to UE 100 over the NAS message.

At 9, based on the configuration of the USIM in the UE 100, the UE 100 expects the protected PLMN and RAT list in the authentication response message. If the configuration indicates mandatory check for preferred PLMN list, then the UE 100 verifies the integrity of the received PLMN list by deriving the key in the same way as the AUSF 310.

At 10a, if the security check fails, the UE 100 sends the authentication reject message to the VPLMN 200. At 10b, the UE 100 performs the PLMN selection, if the protected PLMN and RAT list is missing or verification fails.

At 11a, if the security check is passed and serving PLMN is not the preferred PLMN, the UE 100 sends the authentication reject message to the VPLMN 200. At 11b, the UE 100 performs the PLMN selection considering the PLMN list provided by HPLNM 300.

At 12, if the security check is passed and the serving PLMN is in the preferred PLMN list then, the UE 100 sends the authentication accept message to the VPLMN 200.

Consider an example, the UE 100 sends the register request to the AMF 210. The AMF 210 sends a request to the AUSF 310 of the HPLMN 300 to perform the primary authentication. The AUSF 310 sends a request to the UDM 320/ARPF to provide the AV to carry out the authentication. Based on the HPLMN policy, the UDM 320/ARPF decides to add the preferred PLMN and RAT list along with the AV(s). The UDM 320/ARPF provides the AV(s) with the PLMN and RAT list.

In an embodiment, when the AUSF 310 receives the PLMN and RAT list, the AUSF 310 derives the security keys KH-int and/or KH-enc to protect the PLMN and RAT list. The KH-int and/or KH-enc is derived using at least one of the following parameters: KAUSF, algorithm type distinguishers, algorithm identity, Home Network Identity (MNC+MCC) and other possible parameters.

In an embodiment, a derivation of an initial key is illustrated in the FIG. 7. A derivation of an encrypted key is illustrated in the FIG. 8. As shown in the Table-1, the new Algorithm type distinguisher is defined for the HPLMN Integrity protection (for example, N-Home-int-alg) and/or for encryption (for example, N-Home-enc-alg). In another embodiment, the existing NAS Algorithm type distinguisher is reused for HPLMN Integrity protection (for example, N-NAS-int-alg) and/or for encryption (for example, N-NAS-enc-alg).

TABLE 1

Defining a value for an algorithm distinguisher

| Algorithm distinguisher | Value |
|---|---|
| N-NAS-enc-alg | 0x01 |
| N-NAS-int-alg | 0x02 |
| N-RRC-enc-alg | 0x03 |
| N-RRC-int-alg | 0x04 |
| N-UP-enc-alg | 0x05 |
| N-UP-int-alg | 0x06 |
| N-Home-int-alg | 0x07 |
| N-Home-enc-alg | 0x08 |

In another embodiment, the algorithm(s) to be used for protection (Integrity Protection and/or encryption) of the PLMN and RAT list, whether encryption/decryption to be applied (with respect to the VPLMN 200) are pre-configured in the UE 100 (for example, in an Universal Integrated Circuit Card (UICC)) provided by the HPLMN 300 and/or as part of NAS configuration) by the HPLMN 300.

In another embodiment, the algorithm(s) to be used by the UE 100 for verification of the integrity and/or decryption of the preferred PLMN and RAT list is included along with the preferred PLMN and RAT list and may also the indication whether the PLMN and RAT list is encrypted is sent along with the message. The algorithm identifier values are as follows:

TABLE 2

Ciphering algorithm identifier values

| | | |
|---|---|---|
| '$0000_2$' | NEA0 | Null ciphering algorithm; |
| '$0001_2$' | 128-NEA1 | 128-bit SNOW 3G based algorithm; |
| '$0010_2$' | 128-NEA2 | 128-bit AES based algorithm; and |
| '$0011_2$' | 128-NEA3 | 128-bit ZUC based algorithm. |

TABLE 3

Integrity algorithm identifier values

| | | |
|---|---|---|
| '$0000_2$' | NIA0 | Null Integrity Protection algorithm; |
| '$0001_2$' | 128-NIA1 | 128-bit SNOW 3G based algorithm; |
| '$0010_2$' | 128-NIA2 | 128-bit AES based algorithm; and |
| '$0011_2$' | 128-NIA3 | 128-bit ZUC based algorithm. |

Further, the AUSF 310 sends the 5G-AIA message over N12 to the SEAF 220. In the 5G-AIA message, the AUSF 310 includes the integrity protected preferred PLMN and RAT list (includes the Message Authentication Code for Integrity (MAC-I)) to the AMF 210/SEAF 220, using the HPLMN key (derives further key using the key KAUSF and also encrypts the list, if supported). Based on the HPLMN policy, the HPLMN 300 includes the protected preferred PLMN and RAT list in the 5G-AIA message and for the VPLMN 200 to provide PLMN and RAT list from the HPLMN 300 in the authentication request. When the AUSF 310 receives the PLMN list from the UDM 320, the AUSF 310 protects the PLMN list before sending the PLMN list to the UE 100 via the AMF 210/SEAF 220.

In an embodiment, the input parameters to the integrity algorithm (NIA) are PLMN and RAT list, Integrity protection key (for example, KH-int) derived from Key KAUSF, RAND (one of the parameter in the AV) and other possible parameters (for example, length of the list LENGTH, NONCE, like so). RAND and/or NONCE is used to derive cryptographic separate MAC-I for each derivation corresponding to the AV. Based on these input parameters, the AUSF 310 computes a message authentication code (MAC-I) using the integrity algorithm NIA. In another embodiment, instead of NIA, Key Derivation Function (KDF) is used for MAC-I generation. The message authentication code is then appended to the message when sent. The UE 100 computes the expected message authentication code (XMAC-I) on the message received in the same way as the AUSF 310 computed its message authentication code on the message sent and verifies the data integrity of the message by comparing it to the received message authentication code. The derivation of MAC-I/XMAC-I on the PLMN and RAT list is illustrated in the FIG. 9.

In an embodiment, a counter COUNT is used as one of the input parameter to the integrity algorithm and the COUNT is included along with the MAC-I, so that the receiver of the UE 100 can use the COUNT value for XMAC-I calculation.

As shown in the FIG. 10, the input parameters to the ciphering algorithm (NEA) encryption key (for example, KH-enc) derived from Key KAUSF, RAND (one of the parameter in the AV) and other possible parameters (for example, length of the list LENGTH, NONCE, like so). RAND and/or NONCE is used to derive cryptographic separate Key Streams for each derivation corresponding to the AV. The ciphering of network steering information is illustrated in the FIG. 10.

In an embodiment, a counter COUNT is used as one of the input parameter to the algorithm and COUNT is included along with the message, so that the receiver will use the COUNT value for decryption.

In an embodiment, if multiple AVs are received from the UDM 320, then the AUSF 310 generates the MAC-I for each AV (using corresponding KAUSF, RAND like so) and provides multiple AVs and corresponding protected PLMN and RAT List to the SEAF 220/AMF 210.

In an embodiment, the AUSF 310 generates a new KAUSF Key Set Identifier (for example, ngKSIausf) to identify the KAUSF. Subscription Permanent Identifier (SUPI) along with the KAUSF Key Set Identifier, uniquely identifies the KAUSF of the UE 100. The AUSF 310 provides the KAUSF Key Set Identifier along with the AV to the UE 100 via the AMF 210/SEAF 220. The AMF 210/SEAF 220 may store KAUSF Key Set Identifier along with ngKSI.

In an embodiment, the sequence number of the AV and/or RAND of the AV and the SUPI uniquely identifies the KAUSF of the UE 100.

The AMF 210/SEAF 220 sends the received protected PLMN list(s) transparently to the UE 100 in the NAS message (i.e., authentication request message). In an embodiment, the AMF 210/SEAF 220 selects the AV, if the AMF 210/SEAF 220 receives multiple AVs, and sends the corresponding protected PLMN list(s) transparently to the UE 100 in the NAS message.

Based on the configuration (in an example in the USIM) in the UE 100, the UE 100 expects the protected PLMN and RAT list in the authentication request message. If the configuration indicates mandatory check for the preferred PLMN and RAT list, then the UE 100 verifies the integrity of the received PLMN and RAT list, by deriving the key in the same way as the AUSF 310.

In an embodiment, the UE 100 performs the PLMN selection, if the protected PLMN and RAT list is missing or verification fails. In another embodiment, the UE 100 performs the PLMN selection, if the protected PLMN and RAT list verification of integrity is successful, but the serving PLMN is not the preferred PLMN/RAT in the received list.

In another embodiment, the UE 100 shall return authentication response message to the SEAF 220 over the NAS message, if the protected list verification of integrity is successful and the serving PLMN is in the preferred PLMN/RAT in the received list or no preferred PLMN available in that particular area.

FIG. 4 is a sequence flow diagram illustrating step by step procedures for providing the list of preferred PLMN list during the registration accept procedure in the wireless communication network, according to embodiments as disclosed herein.

At 1, the UE 100 sends the register request message to the AMF 210. At 2, the AMF 210 registers with the UDM 320 by initiating Nudm_UECM_Registration procedure.

Between step 1 and step 2, other procedure may be performed, for example authentication procedure or registration procedure.

In an embodiment, the AMF 210 may provide the Subscription Permanent Identifier (SUPI), Sequence Number of the AV and/or ngKSI and/or RAND of the AV and/or KAUSF Key Set Identifier along with SUPI, so that the AUSF 310 identifies the appropriate KAUSF.

At 3, based on the HPLMN policy, the UDM 320 decides to add the preferred PLMN list. At 4, the UDM 320 requests the AUSF 310 to apply protection for the PLMN/RAT list.

At 5 and at 6, the AUSF 310 protects the preferred PLMN list using the at least one security parameter. At 7, the AUSF 310 sends the 5G-AIA message over the N12 to the SEAF 220. In the 5G-AIA message, the AUSF 310 includes the integrity protected preferred PLMN list using the at least one security parameter.

At 8, the AMF 210/SEAF 220 sends the received protected PLMN list(s) transparently to the UE 100 over the NAS message (i.e., attach request message). In an embodiment, the AMF 210/SEAF 220 selects the AV, if receives multiple AVs, and sends the corresponding protected PLMN list(s) transparently to UE 100 over the NAS message.

At 9, based on the configuration of the USIM in the UE 100, the UE 100 expects the protected PLMN and RAT list in the attach request message. If the configuration indicates mandatory check for preferred PLMN list, then the UE 100 verifies the integrity of the received PLMN list by deriving the key in the same way as the AUSF 310.

At 10*a*, if the security check fails, the UE 100 sends the registration reject message to the VPLMN 200. At 10*b*, the UE 100 performs the PLMN selection, if the protected PLMN and RAT list is missing or verification fails.

At 11*a*, if the security check is passed and serving PLMN is not the Preferred PLMN then, the UE 100 sends the registration reject message to the VPLMN 200. At 11*b*, the UE 100 performs the PLMN selection considering the PLMN list provided by HPLNM 300.

At 12, if the security check is passed and the serving PLMN is in the preferred PLMN list, the UE 100 sends the registration accept message to the VPLMN 200.

The procedure names and message names in the disclosure are used for illustrative propose only and is application for any message/procedure between the following interfaces/reference points: N2, N12, N8, N1, N13, Namf, Nudm, and Nausf.

Consider an example, the UE 100 sends the register request to the AMF 210 and the AMF 210 registers with the UDM 320 by initiating the Nudm_UECM_Registration procedure. Between step 1 and step 2, other procedure may be performed, for example authentication procedure or registration procedure.

Based on the HPLMN policy, the UDM 320/ARPF decides to provide the preferred PLMN and RAT list to the UE 100. The UDM 320/ARPF requests the AUSF 310 to apply protection for the PLMN/RAT list.

In an embodiment, the AMF 210 may provide the Subscription Permanent Identifier (SUPI), Sequence Number of the AV and/or ngKSI and/or RAND of the AV and/or KAUSF Key Set Identifier along with SUPI, so that the AUSF 310 identifies the appropriate KAUSF.

In an embodiment, the UDM 320 may provide the sequence number of the AV and/or ngKSI and/or RAND of the AV and/or KAUSF Key Set Identifier along with the SUPI, so that the AUSF 310 identifies the appropriate KAUSF.

When the AUSF 310 receives the PLMN and RAT list, the AUSF 310 derives the security keys KH-int and/or KH-enc to protect the PLMN and RAT list.

In an embodiment, the AUSF 310 utilizes the latest KAUSF of the SUPI to protect the PLMN and RAT list. In another embodiment, the AUSF 310 identifies the appropriate KAUSF of the SUPI, using the SUPI, Sequence Number of the AV and/or ngKSI and/or RAND of the AV and/or KAUSF Key Set Identifier along with SUPI provided by UDM 320.

The KH-int and/or KH-enc are derived using at least one of the following parameters (e.g., KAUSF, Algorithm type distinguishers, Algorithm identity, Home Network Identity (MNC+MCC) and other possible parameters). The derivation of the Key KH-int is illustrated as shown in the FIG. 7 and the derivation of the Key KH-enc is illustrated as shown in the FIG. 8.

In an embodiment, the new algorithm type distinguisher is defined for the HPLMN Integrity protection (for example, N-Home-int-alg) and/or for encryption (for example, N-Home-enc-alg). In another embodiment, the existing NAS Algorithm type distinguisher is reused for HPLMN Integrity protection (for example, N-NAS-int-alg) and/or for encryption (for example, N-NAS-enc-alg). The Table 1 depicts the algorithm distinguisher along with the value. In another embodiment, the existing KDF is used instead of integrity protection algorithm.

In another embodiment, the algorithm(s) to be used for protection (Integrity Protection and/or encryption) of the PLMN and RAT list is pre-configured in the UE 100 (for example, in the UICC provided by the HPLMN 300 and/or as part of NAS configuration) by the HPLMN 300. In another embodiment, the algorithm(s) to be used by the UE 100 for verification of the integrity and decryption of the preferred PLMN and RAT list is included along with the preferred PLMN and RAT list. The algorithm identifier values are as follows depicted in the Table 2 and Table 3.

Further, the AUSF 310 sends the integrity protected preferred PLMN and RAT list (includes the MAC-I) to the UDM 320/ARPF, using the HPLMN key KAUSF (may derives further key using the key KAUSF and also encrypts the list, if supported).

In an embodiment, the input parameters to the integrity algorithm are PLMN and RAT list, Integrity protection key (for example, may derive further key KH-int) Key KAUSF, RAND (one of the parameter in the AV) and other possible parameters (for example, length of the list LENGTH, NONCE, like so). The RAND and/or NONCE are used to derive cryptographic separate MAC for each derivation corresponding to the AV. Based on the input parameters, the AUSF 310 computes the message authentication code (MAC-I) using the integrity algorithm NIA. The message authentication code is then appended to the message when sent. The UE 100 computes the expected message authentication code (XMAC-I) on the message received in the same way as the AUSF computed its message authentication code on the message sent and verifies the data integrity of the message by comparing it to the received message authentication code. The derivation of MAC-I/XMAC-I on the PLMN and RAT list is illustrated in the FIG. 9

In an embodiment, the counter COUNT is used as one of the input parameter to the integrity algorithm and the COUNT is included along with the MAC-I, so that the receiver can use the COUNT value for XMAC-I calculation.

In an embodiment, the input parameters to the ciphering algorithm (NEA) encryption key (for example, KH-enc) derived from the Key KAUSF, RAND (one of the parameter in the AV) and other possible parameters (for example, length of the list LENGTH, NONCE, like so). The RAND and/or NONCE are used to derive cryptographic separate key streams for each derivation corresponding to the AV. The ciphering of network steering information is illustrated in the FIG. 10

In an embodiment, the counter COUNT is used as one of the input parameter to the algorithm and the COUNT is included along with the message, so that the receiver will use the COUNT value for decryption.

In an embodiment, if multiple AVs are received from the UDM 320, then the AUSF 310 generates the MAC-I for each AV (using corresponding KAUSF, RAND, or the like) and provides multiple AVs and corresponding protected PLMN and RAT List to the SEAF 220.

In an embodiment, the UDM 320 instead of requesting the AUSF 310 to apply security (as in Step 4 to Step 6), the UDM 320 request the AUSF 310 to provide the security keys, so that the UDM 320 applies protection on the PLMN list. If the UDM 320 request for keys (with details to select appropriate KAUSF), then the AUSF 310 derives appropriate keys and provides the key to the UDM 320. In embodiment, the UDM 320 may skip the Step-4 to Step-6, as it may have the required AV to derive the keys for protection and protects the PLMN list.

Further, the UDM 320 then sends the protected PLMN list to the AMF 210/SEAF 220 are part of the Nudm_UECM_Registration procedure. Further, AMF 210/SEAF 220 sends the received protected PLMN list(s) transparently to the UE 100 over the NAS message (registration accept message). In an embodiment, the AMF 210/SEAF 220 selects the AV, if receives multiple AVs, and sends the corresponding protected PLMN list(s) transparently to the UE 100 over the NAS message.

At 9, based on the configuration in the UE 100, the UE 100 expects the protected PLMN and RAT list in the registration accept message. If the configuration indicates mandatory check for preferred PLMN and RAT list, then the UE 100 verifies the integrity of the received PLMN and RAT list, by deriving the key in the same way as the AUSF 310.

Further, the UE 100 performs the PLMN selection, if the protected PLMN and RAT list is missing or verification fails. Further, the UE 100 performs the PLMN selection, if the protected PLMN and RAT list verification of integrity is successful, but the serving PLMN is not the preferred PLMN/RAT in the received list.

Further, the UE 100 sends the registration complete message to the SEAF 220 over a NAS message, if the protected list verification of integrity is successful and the serving PLMN is in the preferred PLMN/RAT in the received list or no preferred PLMN available in that particular area.

In an embodiment, the UE 100 may responds with a message to the UDM 320/AUSF 310 (via AMF 210/SEAF 220) carrying a protected acknowledgement IE. The protection mechanism is same as the above mentioned procedure, but the UE 100 performs the MAC-I calculation on the response message (may carry the preferred PLMN/access technology combinations) and the UDM 320/AUSF 310 performs the XMAC-I calculation on the received message and checks whether the MAC-I is same as XMAC-I. Similarly, the UE 100 may perform encryption and the AUSF 310/UDM 320 decryption.

In an embodiment, if the check is successful in step 8, then the UE 100 shall insert the received preferred PLMN list into top of the OPLMN list. If the UE determines that there is a higher priority PLMN than currently camped VPLMN, then the UE shall respond with authentication reject message or authentication failure message indicating the AMF 210 to release the current N1 NAS signaling connection, after the releases of the N1 NAS signaling connection, the UE 100 shall attempt to obtain service on a higher priority PLMN as specified in 3GPP TS 23.122 by acting as if timer T that controls periodic attempts (see 3GPP TS 23.122) has expired, otherwise the UE 100 shall respond with authentication response message as described in 3GPP TS 33.501. The mechanism in which UE 100 determines there is a higher priority PLMN than currently camped VPLMN in step 9 is UE implementation dependent.

If check is not successful in step 8 then the UE 100 shall perform PLMN selection as described in 3GPP TS 23.122.

During the first registration procedure over a VPLMN, which is not part of "Operator Controlled PLMN Selector with Access Technology" list stored in the ME, if the authentication procedures is not executed by the VPLMN 200 and the UE 100 enters into 5GMM-IDLE mode after successfully executing the registration procedure, then the UE 100 shall initiate a Service Request procedure by setting ngKSI value to 7.

FIG. 5 is example sequence flow diagram illustrating step by step procedures for providing the list of preferred PLMN list during the registration procedure (in the form of registration accept message) in the wireless communication network, according to embodiments as disclosed herein. At 1, the UE 100 initiates registration by sending the registration request message to the AMF 210. At 2 and at 3, the AMF 210 executes the registration procedure and as part of the registration procedure, the AMF 210 executes primary authentication of the UE 100 and then initiates the NAS Security Mode Command (SMC) procedure, after the authentication is successful.

At 4, the AMF 210 invokes Nudm_SDM_Get service operation message to the UDM 320 to get amongst other information the access and mobility subscription data for the UE 100 as defined in the 3GPP standard.

At 5, the UDM 320 decides to send the steering information. If the HPLMN 300 has configured that their subscribed UE's 100 to mandatorily expect to receive the steering of roaming information during the initial registration procedure, then the UDM 320 shall send the steering of roaming information, otherwise depending on local or operator policy, the UDM 320 decides to send the steering of roaming information to the UE 100 via the VPLMN 200 later if required.

At 6 and at 7, the UDM 320 shall invoke the Steering of Roaming (SoR) Protection service operation with the AUSF 310 to get Message Authentication Code—Integrity and related security parameters (SoR-MAC-IAUSF and counter value). If the HPLMN 300 decided that the UE 100 is to acknowledge the successful security check of the received steering information list, then the UDM 320 indicates (set the indicator) in the SoR Protection service operation request message that it also needs the expected SoRXMAC-IUE for verification of the acknowledge from the UE 100.

In case, the steering information list is not available or the HPLMN 300 determines that no steering of the UE 100 is required, the steering information list shall be set to null value (0x00) and Message Authentication Code—Integrity is calculated on the null value. The inclusion of steering information and the acknowledge indication in the calculation of SoR-MAC-IAUSF allows the UE 100 to verify that the steering information list received is not tampered with or removed by the VPLMN 200 and whether if the UDM 320 requested an acknowledgement. The inclusion of the UDM requested an acknowledgement indication (0x01) in the calculation of the expected SoR-XMAC-IUE allows the UDM 320 to verify that the UE 100 received the steering information list successfully. The UDM 320 provides the SUPI, the SoR Information List or null value and Acknowledge indication (whether SoR-XMAC-IUE is needed or not) to the AUSF 310, to obtain the SoR protection service. On receiving the service request from the UDM 320, the AUSF 310 calculates the MAC-I(s). The SoRMAC-IAUSF is calculated using the key KAUSF, SoR Information List or null value, counter value, Acknowledge indication and other possible parameters as input to the security function KDF. If requested by the UDM 320 for verification of acknowledge from the UE 100, the AUSF 310 calculates the SoR-XMAC-IUE. The SoRXMAC-IUE is calculated using the key KAUSF, counter value, Acknowledge indication (0x01) and other possible parameters as input to the KDF. The counter value is incremented by the AUSF 310 for every new computation of the SoR-MAC-IAUSF. The counter is used as freshness input into SoR-MAC-IAUSF and SoR-MAC-IUE derivations, to mitigate the replay attack.

Further, the AUSF 310 shall send the value of the counter along with the SoRMAC-IAUSF. The UE 100 checks the value of the counter and only accept counter value that is greater than stored value. The UE 100 shall use the stored counter value received from the HPLMN 300, when deriving the SoR-MAC-IUE for the SoR acknowledgement. The AUSF 310 and the UE 100, initializes the counter value to zero (0x00), when the KAUSF is derived and maintains the counter value for lifetime of the KAUSF. The AUSF 310, monotonically increment the counter value for each additional calculated SoR-MAC-IAUSF. The AUSF 310 includes the SoR-MAC-IAUSF, counter value and optionally the SoR-MAC-IUE (if requested by the UDM 320) within the service response message to the UDM 320.

At 8, the UDM 320 responds to the Nudm_SDM_Get service operation to the AMF 210, which includes the steering information list, the SoR-MAC-IAUSF, and the counter value within the access and mobility subscription data and the indication that the UDM 320 requests an acknowledgement from the UE 100 (if needed). If the UDM 320 requests an acknowledgement and received the SoR-XMAC-IUE from the AUSF 310, then it temporarily stores the expected SoR-XMAC-IUE.

At 9, the AMF 210 shall include the steering information list, the SoR-MAC-IAUSF, the counter value and the indication that the UDM 320 requests an acknowledgement from the UE 100 (if included by the UDM 320) to the UE 100 in the registration accept message.

At 10, on receiving the registration accept message, if the UE's USIM is configured with the indication that the UE 100 shall expect to receive the steering of roaming information in the registration accept which is in response to the initial registration request, then the UE 100 shall verify, if the steering of roaming information is received in the initial registration accept message, if steering of roaming information is not available then it is considered as security check fails. If the steering of roaming information is received in the registration accept message then the UE 100 calculates the SoR-MAC-IAUSF (can be termed as expected MAC-I and also "SoR-XMAC-IAUSF") in the same way as the AUSF 310 on the received steering of roaming information, the counter value and the acknowledge indication and verifies whether it matches the SoR-MAC-IAUSF value received in the registration accept message. If either the steering of roaming information is not received, even though UE's USIM is configured with the indication that steering of roaming information shall mandatorily be received in the initial registration accept message or steering of roaming information received but SoR-MAC-IAUSF (SoR-XMAC-IAUSF) calculated by UE and the SoR-MAC-IAUSF received in the registration accept message do not match (security check fails), then the UE 300 shall perform the PLMN selection procedure to select some other PLMN by making the currently camped VPLMN as lower priority PLMN and also mark that there was an SoR failure on the current VPLMN. The UE 100 is expected to perform PLMN selection, following general principles when the UE 100 is allowed to do PLMN selection i.e. only if the UE 100 is not in Manual mode of operation and current PLMN is not part of "User Controlled PLMN Selector with Access Technology". In order to avoid errors in the received steering of roaming information if the security check fails (either the UE 100 is configured in the USIM that the UE 100 is expected to receive the steering of roaming information but did not receive the steering of information in the initial registration accept message or the SoR-MAC-IAUSF (SoR-XMAC-IAUSF: expected MAC-I) calculated by the UE 100 and the SoR-MAC-IAUSF received in the registration accept message do not match) as described above from all the available PLMNs (i.e. all the available PLMNs are part of list where registration was aborted due to SoR verification failure as described above) in that area, then the UE 100 shall neglect the verification failure and continue with the registration procedure to get normal services. If the security check is successful (SoR-MAC-IAUSF (SoR-XMAC-IAUSF) calculated by the UE 100 and the SoR-MAC-IAUSF received in the registration accept message are the same) and acknowledgement is not requested in the steering of roaming information, the UE 100 determines based on available PLMN list of the area that there is a higher priority PLMN than currently camped chosen VPLMN then the UE 100 can release the NAS signaling connection locally and perform PLMN selection to acquire services of higher priority PLMN available as per steering of roaming information received in the registration accept message. If acknowledgement is requested in the steering of roaming information, the UE 100 determines based on available PLMN list of the area that there is a higher priority PLMN than currently camped chosen VPLMN then the UE 100 perform the PLMN selection to acquire services of higher priority PLMN available as per steering of roaming information received in the registration accept message after sending registration complete message or the UE 100 shall wait for release of the NAS signaling connection till implementation dependent timer, if the timer expires release the NAS signaling connection locally before performing PLMN selection. In this case the UE 100 shall take care that it does not initiate PDU session establishment.

At 11, if the UDM 320 has requested an acknowledgement from the UE 100 and the UE 100 verified (security check is successful) that the steering of roaming information list has been provided by the HPLMN 300 in step 9, then the UE 100 shall send the registration complete message to the serving AMF 210. The UE 100 shall generate the SoR-MAC-IUE and includes the generated SoR-MAC-IUE in a transparent container in the registration complete message. The SoR-MAC-IUE is calculated by the UE 100 in the same way as the AUSF 310 using the key KAUSF, counter value, Acknowledge indication (0x01) and other possible parameters as input to the KDF.

At 12, the AMF 210 sends a Nudm_SDM_Info request message to the UDM 320. If the transparent container with the SoR-MAC-IUE is received in the registration complete message, the AMF 210 shall include the transparent container in the Nudm_SDM_Info request message.

At 13, if the HPLMN 300 indicated that the UE 100 is to acknowledge the successful security check of the received steering information list in step 8, then the UDM 320 shall compare the received SoR-MAC-IUE with the expected SoR-XMAC-IUE that the UDM stored temporarily in step 8. It is possible for the HPLMN 300 to encrypt the List using the HPLMN specific key and other possible parameter and provide it to the UE 100 at 8 and the UE 100 to decrypt the list at 10, in addition to the integrity protection.

FIG. 6 is a sequence flow diagram illustrating step by step procedures for providing the list of preferred PLMN list during an Extensible Authentication Protocol (EAP) based primary authentication in the wireless communication network, according to embodiments as disclosed herein.

At 1, the UE 100 sends the register request to the AMF 210. At 2, The AMF 210 sends the request to the AUSF 310 to perform the primary authentication.

At 3, the AUSF 310 sends a request to the UDM 320/ARPF to provide the AV to carry out the authentication. At 4, based on the HPLMN policy, the UDM 320/ARPF decides to add the preferred PLMN and RAT list along with the AV(s). At 5, the UDM 320/ARPF provides the AV(s) with the PLMN and RAT list.

At 6, in an embodiment, when the AUSF 310 receives the PLMN and RAT list, the AUSF 310 derives the security keys (e.g., KH-int and/or KH-enc) to protect the PLMN and RAT list. The KH-int and/or KH-enc is derived using at least one of the following parameters: KAUSF, Algorithm type distinguishers, Algorithm identity, Home Network Identity (MNC+MCC) and other possible parameters. The derivation of the initial key (i.e., KH-int) is illustrated in the FIG. 7 and the derivation of the encrypted key (KH-ent) is illustrated in the FIG. 8.

In an embodiment, the new algorithm type distinguisher is defined for the HPLMN Integrity protection (for example, N-Home-int-alg) and/or for encryption (for example, N-Home-enc-alg). In another embodiment, the existing NAS Algorithm type distinguisher is reused for the HPLMN Integrity protection (for example, N-NAS-int-alg) and/or for encryption (for example, N-NAS-enc-alg).

In an embodiment, the algorithm(s) to be used for protection (Integrity Protection and/or encryption) of the PLMN and RAT list is pre-configured in the UE 100 (In an example, in the UICC provided by the HPLMN 300 and/or as part of NAS configuration) by the HPLMN 300. In another embodiment, the algorithm(s) to be used by the UE 100 for verification of the integrity and decryption of the preferred PLMN and RAT list is included along with the preferred PLMN and RAT list. The algorithm identifier values are provided in the Table 1-Table 3. The derivation of MAC-I/XMAC-I on the PLMN and RAT list is illustrated in the FIG. 9.

At 7, the AUSF 310 sends the 5G-AIA message over the N12 to the SEAF 220. In the 5G-AIA message, the AUSF 310 includes the integrity protected preferred PLMN and RAT list (includes the MAC-I) to the AMF 210/SEAF 220, using the HPLMN key the KAUSF (may derives further key using the key KAUSF and also encrypts the list, if supported). Based on the HPLMN policy, the HPLMN 300 includes the protected preferred PLMN and RAT list in the 5G-AIA message and for the VPLMN to provide PLMN and RAT list from the HPLMN 300 in the authentication request. When the AUSF 310 receives the PLMN list from the UDM 320, the AUSF 310 protects the PLMN list before sending the PLMN list to the UE 100 via the AMF 210/SEAF 220.

In an embodiment, the input parameters to the integrity algorithm (NIA) are PLMN and RAT list, Integrity protection key (for example, KH-int) derived from key, KAUSF, RAND (one of the parameter in the AV) and other possible parameters (for example, length of the list LENGTH, NONCE, like so). The RAND and/or NONCE are used to derive cryptographic separate MAC for each derivation corresponding to the AV. Based on these input parameters, the AUSF 310 computes a message authentication code (MAC-I) using the integrity algorithm NIA. The message authentication code is then appended to the message when sent. The UE 100 computes the expected message authentication code on the message received in the same way as the AUSF 310 computed its message authentication code on the message sent and verifies the data integrity of the message by comparing it to the received message authentication code.

In an embodiment, the counter COUNT is used as one of the input parameter to the integrity algorithm and the COUNT is included along with the MAC-I, so that the receiver can use the COUNT value for XMAC-I calculation.

In another embodiment, the input parameters to the integrity algorithm (NIA) are PLMN and RAT list, Integrity protection key using the authentication Key K_aut (derived from the Transient EAP Key (TEK)) and other possible parameters (for example, length of the list LENGTH, NONCE, like so). The RAND and/or NONCE are used to derive cryptographic separate MAC-I for each derivation corresponding to the AV.

In an embodiment, the input parameters to the ciphering algorithm (NEA) encryption key (for example, KH-enc) derived from Key KAUSF, RAND (one of the parameter in the AV) and other possible parameters (for example, length of the list LENGTH, NONCE, like so). The RAND and/or NONCE are used to derive cryptographic separate Key Streams for each derivation corresponding to the AV. The ciphering of the network steering information is illustrated as shown in the FIG. 10

In an embodiment, the counter COUNT is used as one of the input parameter to the algorithm and COUNT is included along with the message, so that the receiver will use the COUNT value for decryption.

In an embodiment, the input parameters to the ciphering algorithm (NEA) are encryption key using the encryption key K_encr (derived from the Transient EAP Key (TEK)) and other possible parameters (for example, length of the list LENGTH, NONCE, or the like).

In another embodiment, the AUSF 310 generates a new KAUSF Key Set Identifier (for example, ngKSIausf) to identify the KAUSF. Subscription Permanent Identifier (SUPI) along with the KAUSF Key Set Identifier uniquely identifies the KAUSF of the UE 100. The AUSF 310 provides the KAUSF Key Set Identifier along with the AV to the UE 310 via the AMF 210/SEAF 220. The AMF 210/SEAF 220 may store KAUSF Key Set Identifier along with ngKSI.

In an embodiment, the sequence Number of the AV and/or RAND of the AV and the SUPI uniquely identifies the KAUSF of the UE 100.

In another embodiment, the protected PLMN and RAT list are provided to the UE 100 using the EAP (Extensible Authentication Protocol)-Request/AKA (Authentication and Key Agreement)-Notification mechanism.

In an embodiment, the protected PLMN and RAT list along with the security parameters (for example, MAC-I, like so) are provided (encoded) in a vendor specific (for example, 3GPP) Type, Length, Value format.

At 8, the AMF 210/the SEAF 220 sends the received protected PLMN list(s) transparently to the UE 100 over the NAS message (i.e., authentication request message). In an embodiment, the AMF 210/SEAF 220 selects the AV, if receives multiple AVs, and sends the corresponding protected PLMN list(s) transparently to the UE 100 in the NAS message.

At 9, based on the configuration of the UE 100, the UE 100 expects the protected PLMN and RAT list in the authentication request message. If the configuration indicates mandatory check for preferred PLMN and RAT list, then the UE 100 verifies the integrity of the received PLMN and RAT list, by deriving the key in the same way as the AUSF.

At 10a, the UE 100 sends the authentication reject message to the VPLMN 200, if the security check is failed. At 10b, the UE 100 performs the PLMN selection, if the protected PLMN and RAT list is missing or verification fails.

At 11a, in another embodiment, the UE 100 sends the authentication reject message to the VPLMN 200, if the protected PLMN and RAT list verification of integrity is successful, but the serving PLMN is not the preferred PLMN/RAT in the received list. At 11b, the UE 100 performs the PLMN selection considering the PLMN list is provided by the HPLMN 300.

At 12, In an embodiment, the UE 100 sends the authentication response message to the SEAF 220 over the NAS message, if the protected list verification of integrity is successful and the serving PLMN is in the preferred PLMN/RAT in the received list or no preferred PLMN available in that particular area.

FIG. 12 is a sequence flow diagram illustrating step by step procedures for providing the list of preferred PLMN list when the UE 100 is already registered with the VPLMN 200, according to embodiments as disclosed herein. Consider, when the UE 100 is already registered with the VPLMN 200 and the HPLMN 300 wants to update the preferred PLMN/access technology combinations to the UE 100.

At 1, the UDM 320 of the HPLMN 300 decides to update preferred PLMN/access technology combinations in the UE 100. At 2, The UDM 320 sends the Nudm_SubData_UpdateNotif message to the AUSF 310 which includes preferred PLMN/access technology combinations.

At 3, the AUSF 310 sends Nausf_Initiate_Auth request message to the AMF 210 with parameters same as the 5G-AIR message. The preferred PLMN/access technology combinations are protected using the latest AV received from the UDM 320/ARPF and which will be included in the Nausf_Initiate_Auth request message.

At 4, the AMF 210 sends the authentication request message transparently carrying the protected preferred PLMN/access technology combinations along with other existing parameters of authentication request message.

At 5, the UE 100 performs integrity check (and/or decryption) on the received protected preferred PLMN/access technology combinations. If check is not successful then, the UE 100 proceeds with PLMN selection procedure. If check is successful in step 5 then the UE 100 responds with authentication response message carrying the protected acknowledgement IE.

At 6, the AMF 210 sends the Nausf_Initiate_Auth_Resp message to the AUSF 310. This message carries protected acknowledgement IE. The AUSF 310 performs a security check of acknowledgement IE.

At 7, The AMF 210 sends Nudm_SubData_UpdateNotif_Resp to the UDM 320 which indicates if protected acknowledgement IE has passed or failed the security check.

In general, the AUSF 310 and the UDM 320 will determine whether the AUSF 310 and the UDM 320 sent preferred PLMN/access technology combinations was updated to the UE 100 successfully or not. Otherwise HPLMN 300 may re-try the procedure.

In an embodiment, when the UE 100 receives preferred PLMN/access technology combination and passes the integrity protection (or ciphering) check. Then, the UE 100 shall proceed with registration procedure (so that VPLMN 200 can continue with the registration procedure) message in any of the following cases:

The UE 100 has the available PLMN list (i.e. the UE 100 had searched for available PLMN's in the area) and current VPLMN 200 is the most preferred available PLMN in that area as per the latest received preferred PLMN/access technology combination, and The network had indicated (either through NAS signaling message or the UE configuration) that UE 100 shall continue with authentication or registration procedure before searching for highest preferred available PLMN.

In an embodiment, when the UE 100 receives preferred PLMN/access technology combination and passes the integrity protection (or ciphering) check. Then, the UE 100 shall not proceed with registration procedure message instead UE 100 shall indicate AMF 210 (with reject cause or new IE) over the NAS message (e.g., authentication response message or authentication reject message or authentication failure message) to release the existing NAS N1 signaling connection or the UE 100 can do a local release of the NAS N1 signaling connection, in any of the following cases:

The UE 100 does not have the available PLMN list (i.e. the list of available PLMN's in the area). The UE 100 have the available PLMN list (i.e. the UE 100 had searched for available PLMN's in the area) and there is the VPLMN 200 which is more preferred than current VPLMN 200 after comparing available PLMN list to the latest received preferred PLMN/access technology combination.

In an embodiment, after receiving or locally releasing the NAS signaling connection, the UE 100 shall perform PLMN selection as if timer T (refer 3GPP TS 23.122) has expired.

In yet another embodiment, for any time update of preferred PLMN/access technology combination, the HPLMN 300 can initiate detach message (or any NAS message) which will force the VPLMN 200 to delete the available Authentication Vectors and indicate to the UE 100 to initiate the NAS message (initial registration request procedure) by setting the KSI to a value which will force the VPLMN 200 to initiate the authentication procedure. Now, the VPLMN 200 will contact the HPLMN 300 to get the fresh Authentication Vectors (AVs) in the process, and the UE 100 will also receive preferred PLMN/access technology combination as part of NAS message (registration accept).

In yet another embodiment, if the UE 100 moves on a VPLMN 200 which is not part of preferred PLMN/access technology combination (OPLMN list of the UE 100) and the UE 100 registers with such VPLMN 200 without executing the authentication procedure (or if the preferred PLMN/access technology combination is not received) and the UE 100 moves to an IDLE mode, then the UE 100 shall set the ngKSI (or an indication) in the NAS message (e.g., Initial direct transfer NAS messages or the like) which will force the VPLMN 200 to reinitiate authentication procedure and get fresh authentication vectors from the HPLMN 300.

In yet another embodiment, if the UE 100 moves on the VPLMN 200 which is not part of preferred PLMN/access technology combination (OPLMN list of the UE 100) and the UE 100 registers with such VPLMN 200 without executing the authentication procedure (or if the preferred PLMN/access technology combination is not received) and the UE 100 moves to an IDLE mode, then the UE 100 shall re-initiate the NAS message (e.g., Initial Registration procedure or the like) which will force the VPLMN 200 to get the preferred PLMN list from the HPLMN 300 and mandatorily provide the preferred PLMN list to the UE 100.

In an embodiment, the IE of preferred PLMN/access technology combination can be made mandatory in the NAS message (for example, during initial registration accept message) (optionally through the UE configuration like USIM or MO Object etc). Now even if the HPLMN 300 doesn't want to update the UE 100 with fresh preferred PLMN/access technology combination, the HPLMN 300 shall send the IE to indicate size of PLMN/access technology combination is zero (or a value to indicate there is no new list is available). This IE has to be protected. This guarantees to the UE 100 that the VPLMN 200 has not removed or modified the preferred PLMN/access technology combination information and indicates to use the stored OPLMN list in the UE 100.

In an embodiment, the preferred PLMN list or PLMN list is a list of PLMN's on which the UE 100 is preferred to be roamed by the HPLMN 300 in the current physical location of the UE 100. This list can be in the form of operator preferred PLMN list etc. The term preferred PLMN list and PLMN list are used interchangeably and means the same.

In another embodiment, for all the procedures discussed in the disclosure, if the UE 100 detects that the PLMN list received is distorted then, the UE 100 shall perform PLMN selection and select some other PLMN on which the UE 100 shall perform its registration procedure or preferred PLMN list fetch procedure.

In an embodiment, the UE 100 detects that received PLMN list is distorted from the VPLMN 200 can be after executing some retries to avoid any abnormal situation. Otherwise, when the UE 100 detects the received PLMN list fails to get decrypted (or fails in Integrity check) it can indicate to the VPLMN 200 so that the VPLMN 200 can freshly execute the procedure and get the preferred PLMN list again from the HPLMN 300. If the process fails again or after multiple retries, the UE 100 shall perform PLMN selection to select some other PLMN.

In an embodiment, the preferred PLMN list fetch procedure is a synonym to any NAS procedure which will be executed to indicate to the VPLMN 200 that the UE 100 wants to obtain the protected preferred PLMN list in current UE location from the HPLMN 300.

FIG. 13 illustrates a sequence of operations for a data path solution (DPS), according to an embodiment as disclosed herein. The UE 100 which is registered with the roaming PLMN can send the list of available PLMN (optional) and available preferred PLMN list (optional) to the home PLMN using the HTTP over the data channel and this can be achieved by sending the data using a network customized application or the URL. The HPLMN 300 can then respond to the HTTP request from the UE 100 with the list of the preferred PLMNs and the UE 100 can consider the OPLMN list changed and act as per 3GPP section (i.e., 23.122). The security of the HTTP packet can be enhanced using HTTPs over IPSec etc. and if the HTTP request fails (Due to DNS failure or HTTP failure etc), the UE 100 can decide to move to a different PLMN after x tries where 'x' is configurable by customer. The UE 100 registers with a Roaming PLMN successfully and establishes a PS context. Further, the UE 100 can send periodically (say once in 24 hrs) in the roaming area. The UE 100 registers with PLMN not part of preferred PLMN list currently configured in the SIM card and triggers the request from the operator asking electronic device to initiate the HTTP request.

FIG. 14 is a block diagram of the UE 100, according to an embodiment as disclosed herein. In an embodiment, the UE 100 includes a preferred PLMN list determiner 110, a communicator 120, a memory 130 and a processor 140. The processor 140 is communicated with the preferred PLMN list determiner 110, the communicator 120, and the memory 130.

In an embodiment, the preferred PLMN list determiner 110 is configured to send the initial register request message to the VPLMN 200. Further, the preferred PLMN list determiner 110 is configured to receive the response message from the VPLMN 200 in response to the initial register request message. The initial register request message mandates the VPLMN 200 to send the preferred PLMN list in the response message. Further, the preferred PLMN list determiner 110 is configured to verify whether the response message includes the preferred PLMN list provided by the HPLMN 300, the VPLMN 200 mandatorily sent the preferred PLMN list transparently and the security check is successful on the received preferred PLMN list using the at least one HPLMN specific security key. Further, the preferred PLMN list determiner 110 is configured to send the reject message to the VPLMN 200 for a NAS signaling connection release and perform the PLMN selection procedure when the security check is failed, or perform a local NAS signaling connection release and perform the PLMN selection procedure when the verification is failed or send the accept message to the VPLMN 200 when the verification is successful.

In another embodiment, the preferred PLMN list determiner 110 is configured to preconfigure the HTTP link to contact the home network. Further, the preferred PLMN list determiner 110 is configured to identify that the UE 100 is in a non-HPLMN network. Further, the preferred PLMN list determiner 110 is configured to trigger a HTTPS request using a stored HTTP link address. Further, the preferred PLMN list determiner 110 is configured to receive the HTTPS response message carrying the preferred PLMN list.

Further, the processor 140 is configured to execute instructions stored in the memory 130 and to perform various processes. The communicator 120 is configured for communicating internally between internal hardware components and with external devices via one or more networks. The communicator 120 is configured for communicating with the preferred PLMN list determiner 110 to manage the anti-steering of roaming in the wireless communication network.

The memory 130 also stores instructions to be executed by the processor 140. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory. In certain examples, a non-transitory storage medium may store data that can, over time, change (e.g., in Random Access Memory (RAM) or cache).

Although the FIG. 14 shows various hardware components of the UE 100 but it is to be understood that other embodiments are not limited thereon. In other embodiments, the UE 100 may include less or more number of components. Further, the labels or names of the components are used only for illustrative purpose and does not limit the scope of the invention. One or more components can be combined together to perform same or substantially similar function to manage the anti-steering of roaming in the wireless communication network.

FIG. 15 is a flow diagram 1500 illustrating various operations performed, by the UE 100, for managing anti-steering of roaming in the wireless communication network, according to an embodiment as disclosed herein. The operations (1502-1510) are performed by the preferred PLMN list determiner 110.

At 1502, the method includes sending the initial register request message to the VPLMN 200. At 1504, the method includes receiving the response message from the VPLMN 200. At 1506, the method includes verifying whether the response message includes the preferred PLMN list provided by the HPLMN 300, and the VPLMN 200 mandatorily sent the preferred PLMN list transparently to the UE, and a security check is successful on the received preferred PLMN list using at least one HPLMN specific security key. At 1508, the method includes sending the reject message to the VPLMN 200 for the NAS signaling connection release and performing the PLMN selection procedure, when the verification is failed. At 1510, the method includes performing the local NAS signaling connection release and performing the PLMN selection procedure when the verification is failed. At 1512, the method includes sending the accept message to the VPLMN 200, when the verification is successful.

The various actions, acts, blocks, steps, or the like in the flow diagram 1500 may be performed in the order presented, in a different order or simultaneously. Further, in some embodiments, some of the actions, acts, blocks, steps, or the like may be omitted, added, modified, skipped, or the like without departing from the scope of the invention.

FIG. 16 is a flow diagram 1600 illustrating various operations performed, by the HPLMN 300, for managing anti-steering of roaming in the wireless communication network, according to an embodiment as disclosed herein. The operations (1602-1608) are performed by the HPLMN 300.

At 1602, the method includes obtaining the register request message from the VPLMN 200. At 1604, the method includes deriving the at least one HPLMN specific security key based on the at least one security parameter. At 1606, the method includes protecting the preferred PLMN list using the at least one security parameter and the HPLMN specific security key. At 1608, the method includes sending the protected preferred PLMN list to the VPLMN 200.

The various actions, acts, blocks, steps, or the like in the flow diagram 1600 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for steering of roaming by a user equipment (UE) in a wireless communication system, the method comprising:
    sending a registration request message to an access and mobility management function (AMF) in a visited public land mobile network (VPLMN);
    receiving a registration accept message including a preferred PLMN list from the AMF in the VPLMN;
    performing security check of the preferred PLMN list; and
    sending a registration complete message to the AMF in the VPLMN based on a result of the security check,
    wherein the registration accept message includes a message authentication code for integrity (MAC-I), calculated by an authentication server function (AUSF) in a home public land mobile network (HPLMN) for protection of the preferred PLMN list, and
    wherein the MAC-I is calculated by the AUSF in the HPLMN using a key (KAUSF) identified by a subscription permanent identifier (SUPI) of the UE.

2. The method of claim 1, wherein the performing of the security check comprises:
    calculating by the UE a MAC-I of the preferred PLMN list based on the preferred PLMN list in the same way as the AUSF in the HPLMN; and
    verifying by the UE whether the calculated MAC-I of the preferred PLMN list matches a MAC-I of the preferred PLMN list received in the registration accept message.

3. The method of claim 1, wherein the registration complete message includes acknowledge information of the UE and a MAC-I calculated by the UE if the security check is successful.

4. The method of claim 3, further comprising:
    selecting a PLMN other than the VPLMN based on the preferred PLMN list if the VPLMN is not included in the preferred PLMN list.

5. The method of claim 3, further comprising:
    selecting a PLMN other than the VPLMN if the security check is not successful.

6. The method of claim 1, wherein the preferred PLMN list is sent transparently via NAS signaling from the AMF in the VPLMN.

7. A user equipment (UE) for steering of roaming in a wireless communication system, the UE comprising:
    a transceiver; and
    at least one processor coupled with the transceiver and configured to:
        send a registration request message to an access and mobility management function (AMF) in a visited public land mobile network (VPLMN),
        receive a registration accept message including a preferred PLMN list from the AMF in the VPLMN, perform security check of the preferred PLMN list, and send a registration complete message to the AMF in the VPLMN based on a result of the security check, wherein the registration accept message includes a message authentication code for integrity (MAC-I), calculated by an authentication server function (AUSF) in home public land mobile network (HPLMN) for protection of the preferred PLMN list, and wherein the MAC-I is calculated by the AUSF in the HPLMN using a key (KAUSF) identified by a subscription permanent identifier (SUPI) of the UE.

8. The UE of claim 7, wherein the at least one processor is further configured to:

calculate a MAC-I of the preferred PLMN list based on the preferred PLMN list in the same way as the AUSF in the HPLMN, and verify whether the calculated MAC-I of the preferred PLMN list matches the MAC-I of the preferred PLMN list received in the registration accept message.

9. The UE of claim 7, wherein the registration complete message includes acknowledge information of the UE and a MAC-I calculated by the UE if the security check is successful.

10. The UE of claim 9, wherein the at least one processor is further configured to select a PLMN other than the VPLMN based on the preferred PLMN list if the VPLMN is not included in the preferred PLMN list.

11. The UE of claim 9, wherein the at least one processor is further configured to select a PLMN other than the VPLMN if the security check is not successful.

12. The UE of claim 7, wherein the preferred PLMN list is sent transparently via NAS signaling from the AMF in the VPLMN.

* * * * *